(12) United States Patent
Desbiens et al.

(10) Patent No.: US 9,019,592 B2
(45) Date of Patent: Apr. 28, 2015

(54) SYSTEM AND METHOD FOR EMITTING OPTICAL PULSES IN VIEW OF A VARIABLE EXTERNAL TRIGGER SIGNAL

(71) Applicant: Institut National d'Optique, Quebec (CA)

(72) Inventors: Louis Desbiens, St-Augustin-de-Desmaures (CA); Michel Jacob, Quebec (CA)

(73) Assignee: Institut National d'Optique, Quebec, Quebec (CA)

( * ) Notice: Subject to any disclaimer, the term of this patent is extended or adjusted under 35 U.S.C. 154(b) by 0 days.

(21) Appl. No.: 14/171,493

(22) Filed: Feb. 3, 2014

(65) Prior Publication Data

US 2014/0218791 A1     Aug. 7, 2014

Related U.S. Application Data

(60) Provisional application No. 61/759,632, filed on Feb. 1, 2013.

(51) Int. Cl.
*H01S 3/10* (2006.01)
*H01S 3/067* (2006.01)
*H04B 10/17* (2006.01)
*H01S 3/094* (2006.01)

(52) U.S. Cl.
CPC ......... *H01S 3/10015* (2013.01); *H01S 3/06758* (2013.01); *H01S 3/094076* (2013.01); *H01S 3/10007* (2013.01); *H01S 3/10038* (2013.01); *H01S 3/10046* (2013.01); *H01S 3/10069* (2013.01)

(58) Field of Classification Search
CPC ............ H01S 3/10007; H01S 3/10015; H01S 3/10046; H01S 3/10069; H01S 3/06758; H01S 3/10038
See application file for complete search history.

(56) References Cited

U.S. PATENT DOCUMENTS

| | | | |
|---|---|---|---|
| 7,126,746 B2 * | 10/2006 | Sun et al. | 359/333 |
| 7,872,794 B1 * | 1/2011 | Minelly et al. | 359/341.31 |
| 8,073,027 B2 | 12/2011 | Deladurantaye et al. | |
| 2012/0177071 A1 | 7/2012 | Jacob et al. | |
| 2013/0183046 A1 * | 7/2013 | Blanchette et al. | 398/186 |
| 2013/0328504 A1 * | 12/2013 | Yavor | 315/307 |

* cited by examiner

*Primary Examiner* — Eric Bolda
(74) *Attorney, Agent, or Firm* — Merchant & Gould P.C.

(57) ABSTRACT

Method and system for emitting optical pulses in view of a desired output energy of the optical pulses and a variable external trigger signal, using a laser system having a seed laser oscillator optically coupled to one or more cascaded optical amplification stages. For each amplification stage, a plurality of sets of pump pulse parameters are provided, each associated with specific values of the output energy and the trigger period. Proper pumping parameters associated with the received desired value of the output energy and the trigger period of the received trigger signal are selected for each amplification stage, which is pumped accordingly before a seed optical pulse is launched through the system.

9 Claims, 27 Drawing Sheets

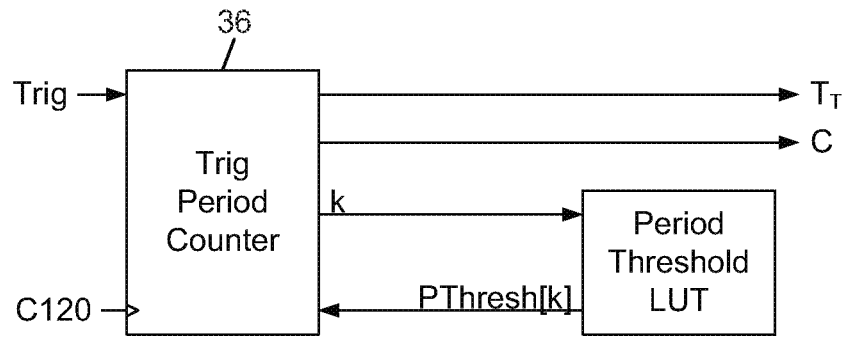
FIG. 11b
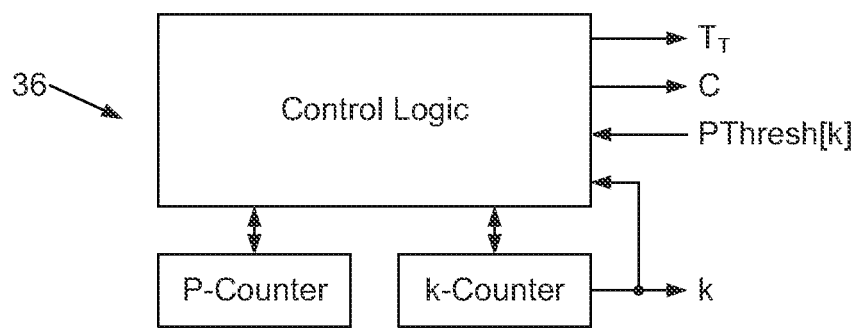
FIG. 11c
| k | 0 | 1 | 2 | ------- | 254 | 255 |
|---|---|---|---|---|---|---|
| PThresh[k] | 120 | 124 | 129 | ------- | 1157431 | 1200000 |
FIG. 11d

SYSTEM AND METHOD FOR EMITTING OPTICAL PULSES IN VIEW OF A VARIABLE EXTERNAL TRIGGER SIGNAL

This application claims benefit of Ser. No. 61/759,632, filed 1 Feb. 2013 in the United States of America and which application is incorporated herein by reference. To the extent appropriate, a claim of priority is made to the above disclosed application.

FIELD OF THE INVENTION

The present invention concerns a laser system and an operating method thereof capable of emitting laser pulses at a desired output energy under the control of an arbitrarily-varying external trigger signal, regardless of the operating conditions.

BACKGROUND

Pulsed fiber laser systems can be based on a Master-Oscillator Power-Amplifier (MOPA) architecture where the desired output optical pulses are generated from seed optical pulses emitted from a seed laser. The seed laser, typically emitting pulses of low energy (Master Oscillator) can be, for example, a pulsed semiconductor diode laser, a pulsed low-power fiber laser, a pulsed LED (Light-Emitting Diode), a pulsed solid-state laser, or even a CW laser source, a LED or an ASE (Amplified Spontaneous Emission) source coupled to an amplitude modulator. The seed optical pulses are subsequently amplified in at least one fiber amplifier unit (Power Amplifier), thus increasing the pulse energy while preserving most of the optical characteristics of the original seed pulse.

There are however optical effects that occur in the fiber amplifiers and which can alter or distort the seed pulse. These effects include nonlinear effects that are sensitive to the peak power of the optical pulses such as SPM (Self-Phase Modulation), SBS (Stimulated Brillouin Scattering), SRS (stimulated Raman Scattering), and linear effects such as gain saturation.

In some applications, gain saturation is the optical effect that has the most significant impact on the waveform (temporal profile) of the optical pulses emitted from a pulsed fiber laser. To mitigate these effects, it is known in the art to pre-compensate the waveform of the seed pulse to take into account the pulse distortion brought by this effect (see for instance U.S. Pat. No. 8,073,027 to Deladurantaye et al., "DIGITAL LASER PULSE SHAPING MODULE AND SYSTEM").

It can be useful to provide a laser system that can emit optical pulses with an arbitrary waveform which is maintained or controlled dynamically during the operation of the system. This type of system would for example be advantageous in laser material processing applications, especially when used in combination with a galvano-scanner system for deflection of the laser beam. A galvano-scanner system uses two mirrors that can be tilted at high speed and, optionally, a dynamically-adjustable beam expander so as to focus an incoming laser beam anywhere over a sample to be processed, through the use of a F-theta lens. The control software of the galvano-scanner computes an optimal path for the laser beam to follow over the sample, depending on the desired end result, and it adjusts the position and speed of the tilting mirrors as well as the current state of the dynamically-adjustable beam expander accordingly. Simultaneously, the control software of the galvano-scanner commands the firing of the laser through the generation of electrical trigger signals for the emission of laser pulses synchronized with the current state of the scanning system.

As a consequence, the repetition rate at which the control software of the scanner triggers the laser can vary dynamically. These variations can even be said to be arbitrary since they are the result of the control software optimization routine for a given process, which is unrelated to the laser operating conditions. This arbitrarily-varying trigger signal is often emitted in the form of bursts, particularly in processes that are non-continuous over the surface of a workpiece.

An example of such a process is the laser inscription of lettering on the surface of a sample. FIG. 2 illustrates an example of an elaborate optical pulse waveform that can be required in applications such as laser material processing and laser marking. The depicted waveform pattern consists in a succession (burst) of 15 sub-pulses having linearly-increasing amplitudes over the duration of the burst, thus resulting in a staircase-like waveform. The sub-pulses have a duration of 10 ns, and they are spaced by a constant time delay of 25 ns. The total energy carried by the burst of 15 sub-pulses is 125 µJ.

To reduce the variability from pulse to pulse in the marks engraved on a workpiece, typical laser systems of current use in the field have features such as "first pulse suppression" or external means for modulating the output beam emitted from the laser as attempts to even out the variations in the energy carried by each laser pulse. There however remains a need for a laser system having the capability to emit laser pulses of controllable energy and waveform in response to an arbitrarily-varying input trigger signal.

SUMMARY

In accordance with one aspect, there is provided a method for emitting optical pulses in view of a desired output energy thereof and an external trigger signal defining trigger pulses at a variable trigger period, the method using a laser system having a seed laser oscillator optically coupled to one or more cascaded optical amplification stages, the method comprising:

a) providing, for each of the amplification stages, a plurality of sets of pump pulse parameters each associated with specific values of the output energy and the trigger period;

b) receiving said desired value of the output energy and said trigger signal; for each of the trigger pulses in the received trigger signal:

c) measuring a current value of the trigger period;

d) selecting, for each of the amplification stages, the pumping parameters associated with the received desired value of the output energy and the current value of the trigger period;

e) sending a pump pulse to each of the amplification stages according to the corresponding selected pump pulse parameters; and f) launching a seed pulse from the seed laser oscillator for propagation through the amplification stages after the pumping thereof.

In accordance with another aspect, there is also provided a laser system for emitting optical pulses in view of a desired value of an output energy thereof and an external trigger signal defining trigger pulses at a variable trigger period.

The laser system includes a seed laser oscillator and one or more cascaded amplification stages optically coupled to the seed laser oscillator.

The laser system also includes a controller. The controller has energy and trig inputs for receiving the desired value of the output energy and the trigger signal, respectively. A trigger period counter configured to measure a current value of the trigger period associated with each trigger pulse is also provided. The controller further includes a pump pulse parameter selector having, for each of the amplification stages, a plurality of sets of pump pulse parameters, each set associated with specific values of the output energy and the trigger period. The pump pulse parameter selector is configured to select, at each trigger pulse of the trigger signal and for each of the amplification stages, the one of the sets of pump pulse parameters associated with the received desired value of the output energy and the current value of the trigger period.

The controller further includes a plurality of pump pulse generators each associated with a corresponding one of the amplification stages. Each pump pulse generator is configured to send a pump pulse to the corresponding amplification stage according to the corresponding selected pump pulse parameters. Finally, the controller includes a seed pulse generator for launching a seed optical pulse from the seed laser oscillator for propagation through the amplification stages, after the pumping thereof.

In accordance with yet another aspect, there is also provided a controller for controlling a laser system to emitting optical pulses in view of a desired value of an output energy thereof and an external trigger signal defining trigger pulses at a trigger period, the laser system having a seed laser oscillator and one or more cascaded amplification stages optically coupled to the seed laser oscillator The controller has energy and trig inputs for receiving the desired value of the output energy and the trigger signal, respectively. A trigger period counter configured to measure a current value of the trigger period associated with each trigger pulse is also provided. The controller further includes a pump pulse parameter selector having, for each of the amplification stages, a plurality of sets of pump pulse parameters, each set associated with specific values of the output energy and the trigger period. The pump pulse parameter selector is configured to select, at each trigger pulse of the trigger signal and for each of the amplification stages, the one of the sets of pump pulse parameters associated with the received desired value of the output energy and the current value of the trigger period.

The controller further includes a plurality of pump pulse generators each associated with a corresponding one of the amplification stages. Each pump pulse generator is configured to send a pump pulse to the corresponding amplification stage according to the corresponding selected pump pulse parameters. Finally, the controller includes a seed pulse generator for launching a seed optical pulse from the seed laser oscillator for propagation through the amplification stages, after the pumping thereof.

Other features and aspects of the invention will be better understood upon reading of preferred embodiments thereof with reference to the appended drawings.

BRIEF DESCRIPTION OF THE DRAWINGS

FIG. 11b is a block diagram of the Matrix Column Selector implemented in the Pump Pulse Parameter Selector.

FIG. 11c is a block diagram of the Trig Period Counter implemented in the Matrix Column Selector.

FIG. 11d illustrates how the Period Threshold LUT is defined as an 1-line, 256-column matrix.

DETAILED DESCRIPTION OF EMBODIMENTS

In accordance with one aspect of the invention, there is provided a method for outputting optical pulses having a desired energy and desired waveform according to an external trigger signal.

The present method is particularly advantageous in the context of the generation of repeatable optical pulses in view an external trigger signal defining trigger pulses at a variable trigger period. In such a context, each trigger pulse aims to launch a new optical pulse. For some application, the trigger period of the trigger signal can be variable, that is, the time delay between consecutive trigger pulses varies in time.

Figure 8:
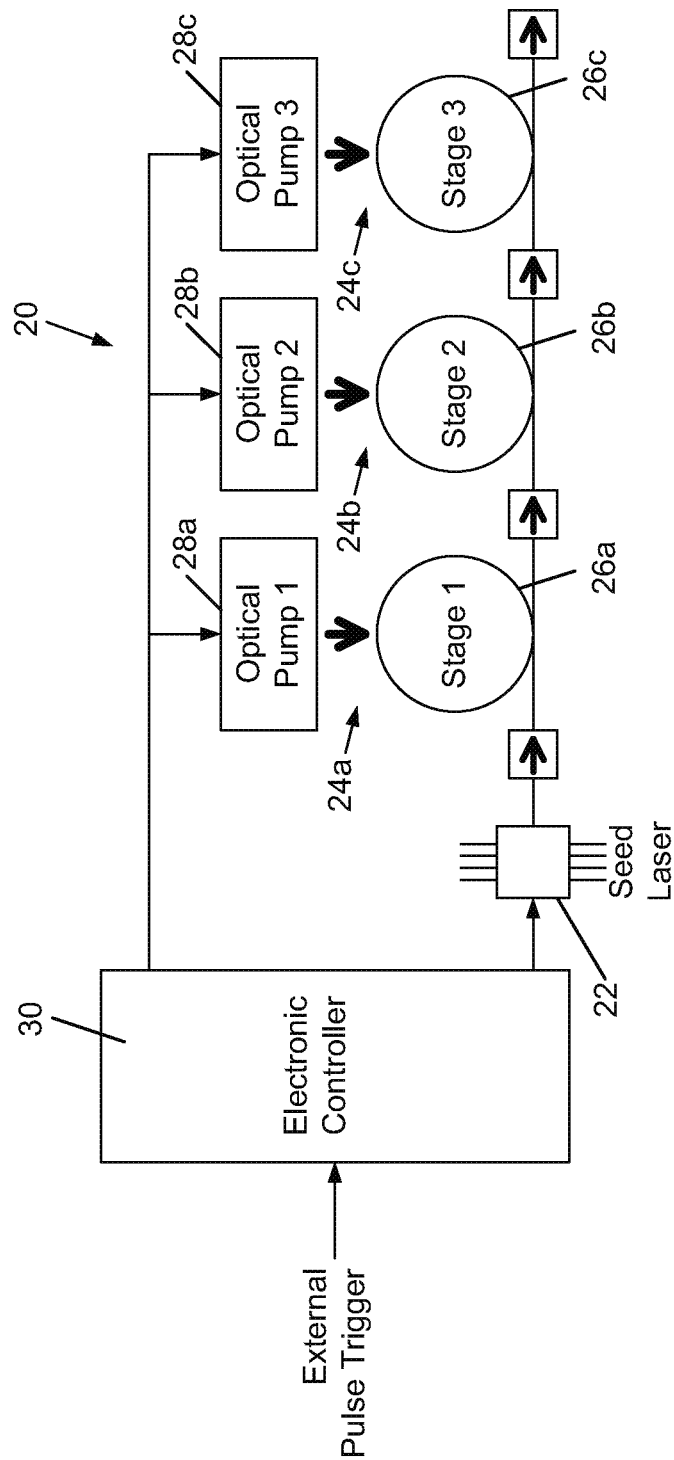
FIG. 8 is a schematic representation of a laser system according to an embodiment of the invention.

This method is carried out using a laser system. Referring to FIG. 8, there is shown an example of a basic structure of a laser system 20 according to one embodiment. In some embodiments the laser system is preferably optical fiber based, but one skilled in the art will readily understand that the principles described herein could be applied to other types of laser systems. The laser system 20 includes a seed laser oscillator 22 and one or more cascaded optical amplification stages 24, and therefore defines a MOPA architecture.

The seed laser oscillator 22 can be embodied by any appropriate laser source, such as, without being limitative, a pulsed semiconductor diode laser, a pulsed low-power fiber laser, a pulsed LED, a pulsed solid-state laser, a CW laser source, a LED or an ASE source coupled to an amplitude modulator, and the like. The seed laser oscillator is configured to emit a seed optical pulse according to a seed waveform upon reception of each trigger pulse of the external trigger signal.

Still referring to FIG. 8, in the illustrated embodiment three amplification stages 24*a*, 24*b*, and 24*c* are shown in a cascade downstream the seed laser oscillator 22, and therefore successively amplify the seed optical pulses to obtain the desired optical pulses after amplification by the last amplification stage 24*c* of the series. It will be readily understood that any appropriate number of amplification stages may be provided in other embodiments.

Each amplification stage 24 includes a corresponding optical amplifier 26 including a gain medium, for example a rare-earth doped optical fiber of appropriate length, and a pump source 28. The pump source 28 provides optical pump energy to the amplifier 26 in order to generate a population inversion therein, thus providing the required optical gain. Each amplification stage 24 may have its own amplification gain and other characteristics, as will be readily understood by one skilled in the art.

The laser system of FIG. 8 further includes a controller 30. The controller may be embodied by one or more circuits, processors, modules and/or other components or assembly having the processing ability to generate control signals for the amplification stages 24 and the seed laser 22, as will be explained further below. On skilled in the art will readily understand that the use of the expression "controller" in the singular form does not preclude the controller 30 from being embodied by a plurality of components cooperating together to perform the functions associated with the controller 30.

In the section below, a method of emitting optical pulses using a laser system such as the one shown in FIG. 8 or the like will be described in more details.

Method According to an Embodiment

The present method involves a control of the optical gain in each amplification stage of the laser system, preferably taking under consideration the gain saturation of each corresponding gain medium.

Figure 1:
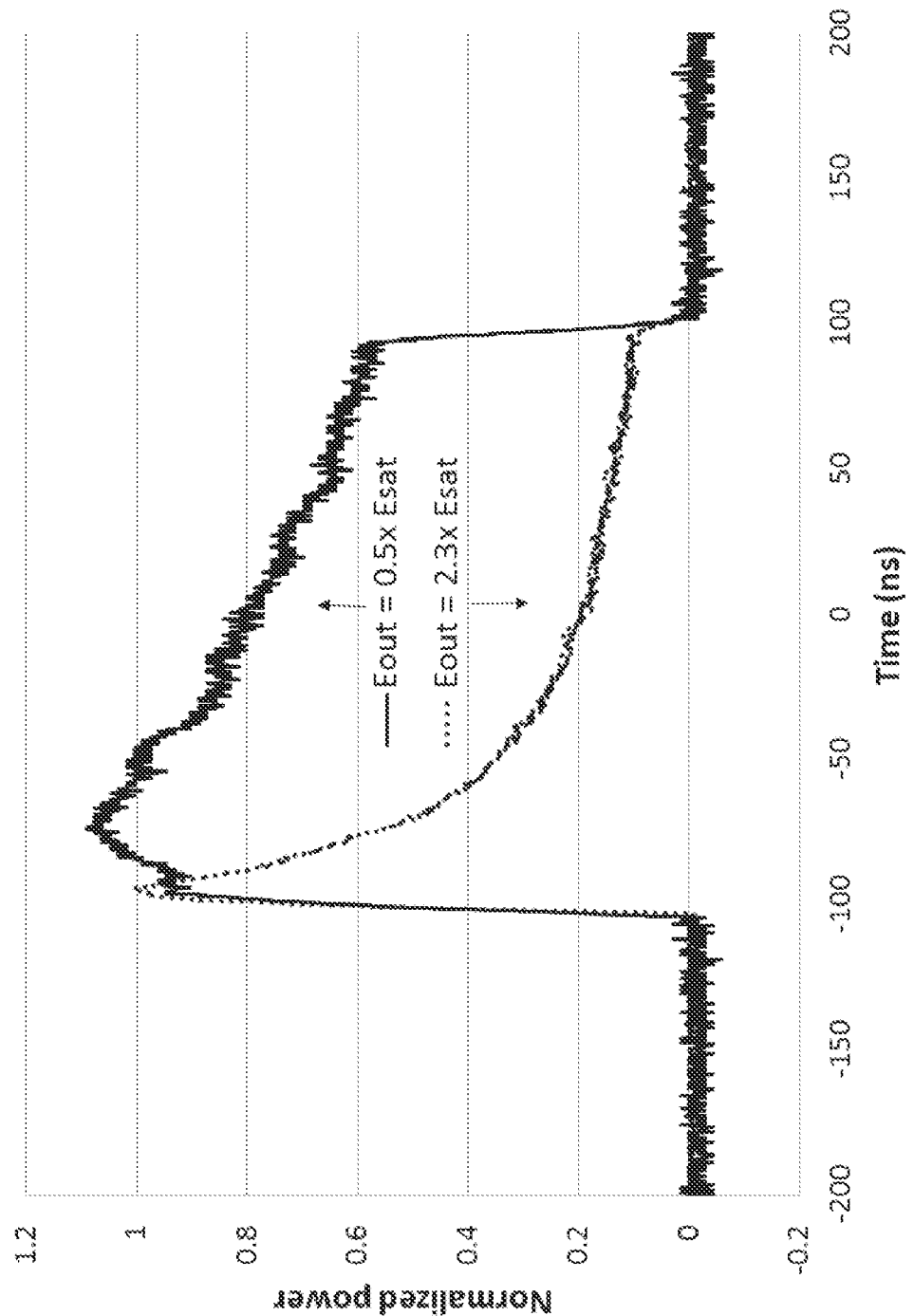
FIG. 1 is a graph of the effect of gain saturation at two different energy levels on the waveform of a seed optical pulse. The initial seed pulses were square-shaped with a 200-ns duration in both cases. The pulses are normalized to their maximum peak power to enhance the visualization of the pulse distortion.
Figure 2:
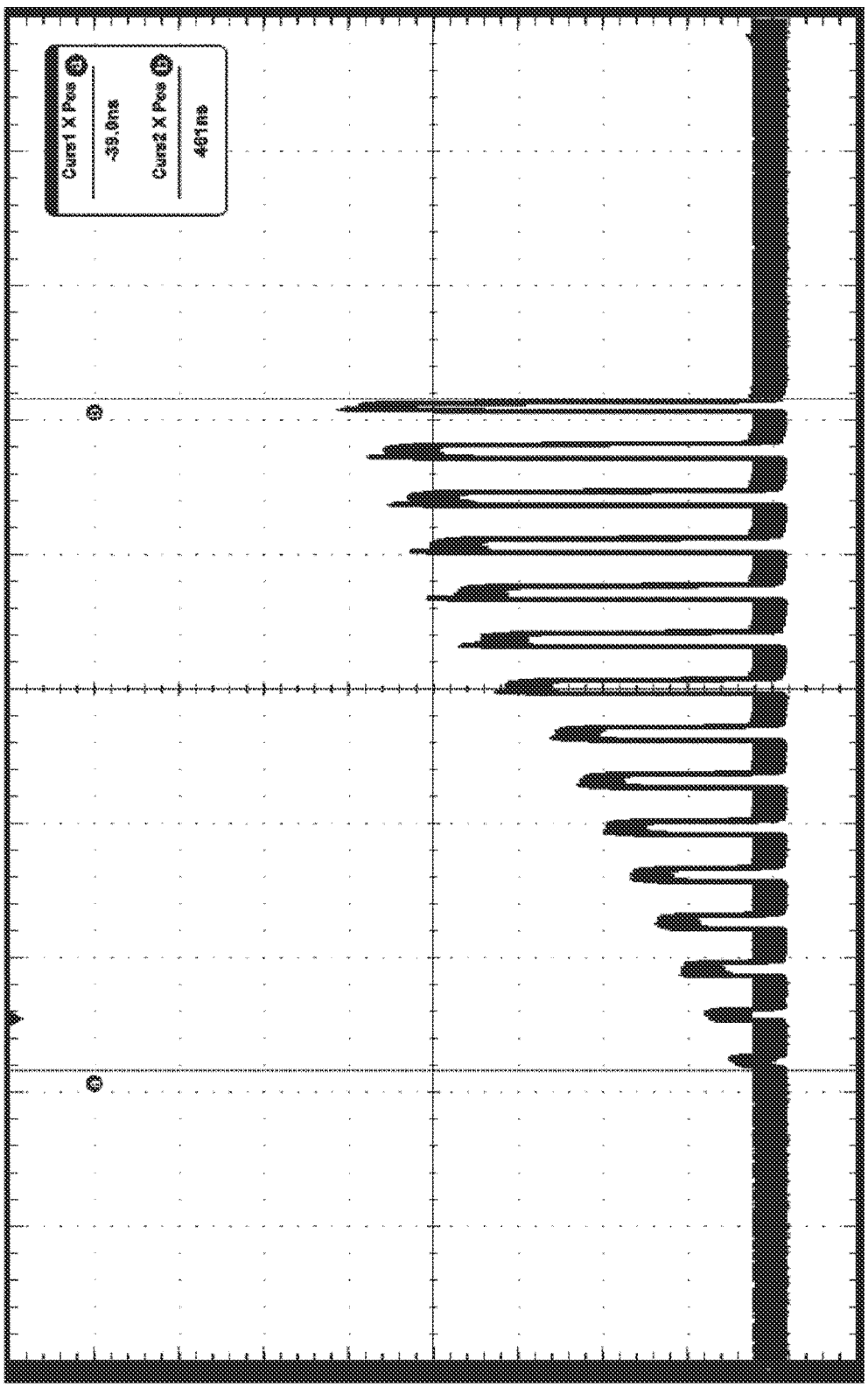
FIG. 2 shows an elaborate, staircase-like optical pulse waveform (125-µJ energy, 200-kHz repetition rate).

Gain saturation may be understood as a dynamic decrease of the available optical gain in an amplifier (gain depletion) occurring while a short optical pulse propagates therethrough. The expression "short optical pulse" refers herein to an optical pulse of duration significantly shorter than the fluorescent lifetime of the rare-earth dopant in the active fiber. Gain saturation makes the beginning (leading edge) of the optical pulse to experience higher optical gain than the end (trailing edge) of the pulse. Stated otherwise, the gain saturation effect causes the instantaneous optical gain to vary more or less appreciably over the duration of an optical pulse propagating in the amplifying medium. This varying optical gain can distort the waveform of the optical pulse, with the level of distortion increasing with the pulse energy targeted at the output of the amplifier. For example, the curves sketched in solid and dotted lines in FIG. 1 show how the waveform of a 200-ns duration optical pulse having an initial square shape is distorted when the optical gain is set to provide an output pulse energy $E_{out}$ of 0.5 and 2.3, respectively. It will be noted that the illustrated pulses are normalized to their maximum peak power to enhance the visualization of the pulse distortion. In FIG. 1, the pulse energy is expressed relative to the saturation energy of the gain medium. The distortions in the pulse waveform increase as the optical pulse is subjected to higher optical gain during its transit in the amplifying medium.

The effect of the gain saturation is characterized by the saturation energy of the gain medium $E_{sat}$:

$$E_{sat} = \frac{Ah\nu}{\Gamma(\sigma_{em} + \sigma_{abs})} \quad (1)$$

where A is the cross-sectional surface area of the actively-doped region of the fiber, hv is the photon energy at the seed signal wavelength, $\sigma_{abs}$ and $\sigma_{em}$ are the absorption and emission cross sections at the signal wavelength, respectively, and $\Gamma$ is the degree of spatial overlap between the optical mode of interest guided by the fiber hosting the gain medium and the actively-doped surface area of the fiber.

The ratio of the gain experienced at the end of the pulse to the gain experienced at the beginning of the pulse is given by:

$$\frac{\text{gain after the pulse}}{\text{gain before the pulse}} = \frac{1}{e^{E_{out}/E_{sat}}} \quad (2)$$

where $E_{out}$ is the pulse energy at the output of the amplifier.

It can be inferred from Equation (1) that for a given wavelength of operation, the saturation energy of an amplifier is a constant as it depends only on intrinsic characteristics of the optical fiber. Knowing that $E_{sat}$ is a constant, it can be deduced from Equation (2) that the ratio of the gain after and before the pulse should be properly controlled in order to reliably obtain a desired output energy $E_{out}$. This should be true from one pulse to the next regardless of the operating conditions such the value of the desired output energy and the pulse repetition rate, determined by the period of the trigger signal.

It is an aspect of the present method that the gain of each amplification stage is controlled in view of the desired value of the output energy of the optical pulses and of the trigger period of the external trigger signal.

The method first includes providing, for each of the amplification stages, a plurality of sets of pump pulse parameters each associated with specific values of the output energy and the trigger period. Each set of pump pulse parameters may for example include a pump pulse duration and a pump pulse amplitude, providing for square pump pulses. Optionally, the method may further include selecting an input waveform of the seed optical pulse in view of a desired output waveform, a desired output energy or both.

For example, as will be readily understood by one skilled in the art, in some implementations where optical pulses of constant energy and waveform are desired, it can be advantageous to control both the level of optical gain in each amplification stage on a short time scale, preferably from pulse to pulse, and the seed pulse waveform, to have the capability of preserving the same output pulse waveform independently of the pulse energy level.

Figure 3:
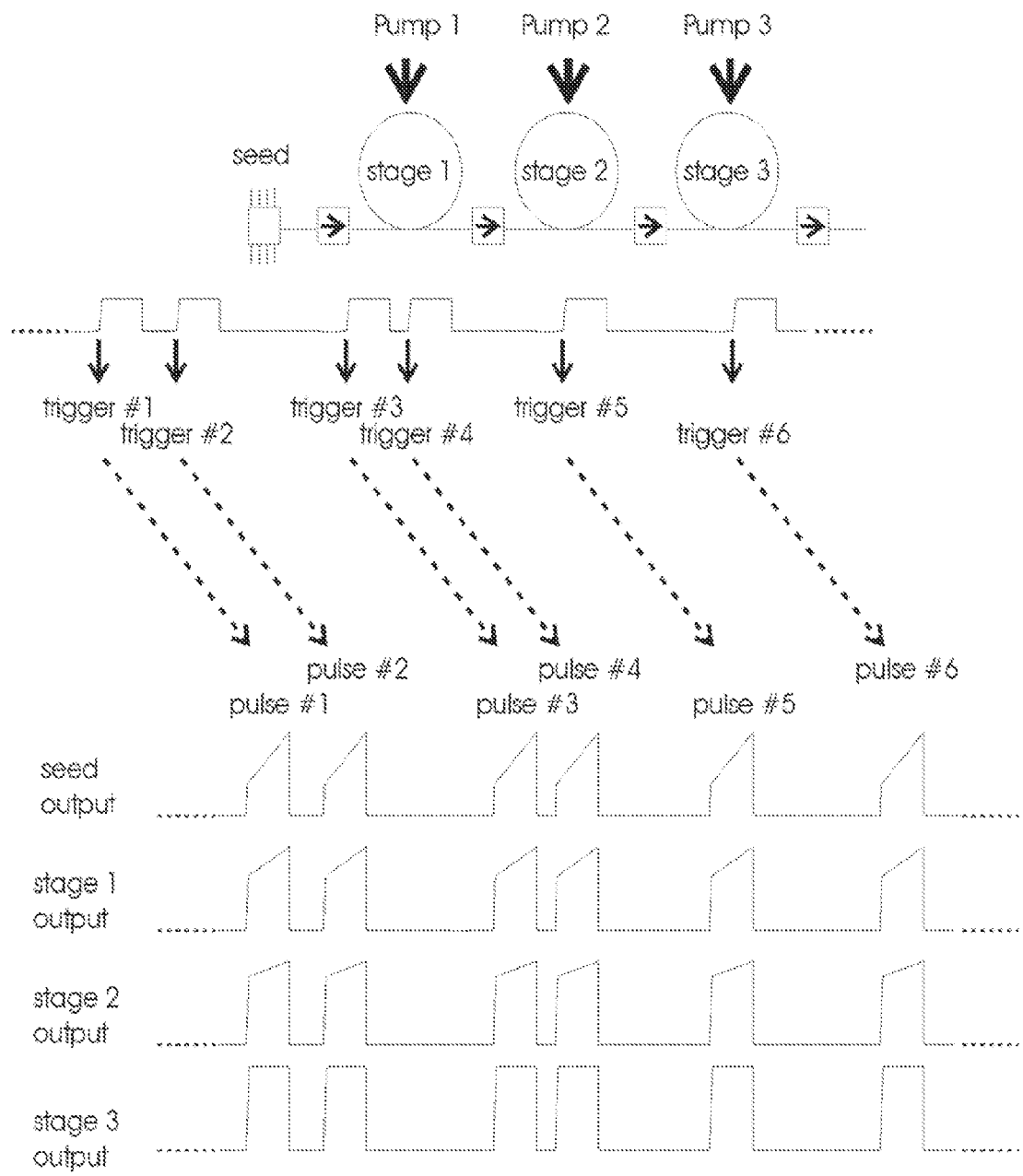
FIG. 3 is an overview of the operating principle of a fiber laser system emitting laser pulses having constant energy and waveform according to one embodiment.

In some embodiments, it may be desirable to keep the output energy constant from pulse to pulse, despite potentially significant variations in the trigger signal. FIG. 3 illustrates how a constant pulse energy laser source according to such an embodiment could operate. In this embodiment the energy per pulse after a given amplification stage should be the same from one pulse to the next, even though the period between each successive pulse can vary significantly. By operating with a same gain in each amplifier for every individual pulse, one ensures satisfactory gain saturation compensation and, consequently, output pulses with a constant energy and waveform.

Several techniques may be used to determine the optimal input waveform and pump pulse parameters for various operating conditions. In some implementations, the determination of the seed pulse waveforms as well as the optimal pump pulse parameters of each individual amplification stage for a given output pulse waveform and desired output pulse energy can be performed using a numerical propagation approach. In such an embodiment, the output optical pulse is numerically propagated back in each amplification stage starting with the last one using Equations (3) and (4):

$$I_{in}(t) = \frac{I_{out}(t)}{G(t)} \quad (3)$$

$$G(t) = 1 + (G_0 - 1)\exp[-U_{out}(t)/E_{sat}] \quad (4)$$

where $G_0$ is the small signal gain, $I_{out}$ and $I_{in}$ are respectively the output and input (seed) pulse waveforms, each representing the instantaneous power as a function of time, $U_{out}$ the cumulated output pulse energy and $E_{sat}$ the saturation energy of the amplifier.

$G_0$ can be varied to find the optimal input pulse conditions satisfying all of the following, amplifier design-specific, limitations:

The maximum peak power at the input of the amplification stage;
The maximum pulse energy at the input of the amplification stage;
The maximum average power at the input of the amplification stage;
The maximum effective gain out of the amplification stage.

If a satisfactory input pulse cannot be found, then the desired output pulse characteristics are simply not compatible with the amplifier.

After back-propagating through all the amplification stages, one obtains, for a given desired output energy, the required seed pulse waveform to be generated as well as the effective gain to produce in each amplification stage.

In one embodiment, the task of determining the appropriate pumping pulse duration and amplitude is performed through the use of pumping matrices. For instance, for a desired output waveform can correspond one pumping matrix per amplification stage.

The pump pulse parameters for each amplification stage may be provided as elements of the corresponding matrix in which each row corresponds to a given value of the output energy, and each column corresponds to a value of the trigger period. It should be noted that for each amplification stage, even intermediary ones, the output energy associated with each element of the matrix is the energy of the optical pulse as emitted at the end of the succession of amplification stage, as opposed to the output energy immediately after this particular stage. The pumping matrix of any given amplification stage may therefore give, as a function of the last measured trigger period, the pulse duration and amplitude of the pump control signal that is generated for this stage, prior to the emission of the seed pulse.

The determination of the values to be inputted in the multidimensional pumping matrix can be made as a pre-calibration of the laser system and stored in the controller, or the controller may include the algorithms allowing this determination after having been associated with a given laser system. Those values are system-specific as they depend on the losses between each amplification stages (losses associated with the insertion of optical components) and the efficiency of each amplification stage to convert the pump pulse energy into signal pulse energy.

The efficiency of each amplification stage depends on the trigger period, the pulse energy at the input of the amplification stage and the target pulse energy at the output of the amplification stage. The knowledge of this pump efficiency is used to determine the required pump energy to be produced for each stage, at each pumping interval of each combination of input and output signal energy levels. The pump duration and amplitude are readily obtained from this pump energy and the characteristics L-I curve of the pump, and when multiple combination of amplitude and duration can produce the required pump energy it may be advantageous to favor short pump pulses as it minimizes the Amplified Spontaneous Emission (ASE) out of the system.

The input pulse energy and output pulse energy for each amplification stage may be obtained from the back propagation calculation through the amplifiers performed to determine the gain saturation compensated seed shape and optimal operating conditions of each amplification stages.

In one embodiment, the determination of this system-specific, operating conditions-specific pump conversion efficiency can be performed by developing a numerical, physical model of each amplification stage. Given a particular set of operating conditions for each amplification stage, the model is run by varying the trigger period to determine the pump conversion efficiency as a function of the trigger period. This obtained efficiency curve is valid only for a given set of operating conditions which correspond to one specific output energy. This process needs to be repeated for all the allowable output energy levels, so as to be able to fill up completely the multidimensional pumping matrix.

In another embodiment, the system-specific, operating conditions-specific pump conversion efficiency may be determined in a "brute force" manner, where each amplification stage is characterized by varying the trigger period, the input pulse energy, the pump duration and amplitude and measuring the output energy of the amplification stage under test. Based on these experimental results an efficiency matrix can be produced and referred to when the pumping matrix calculation algorithm scan all the possible input parameters (trigger period and output energy) to fill up the pumping matrix.

Figure 4:
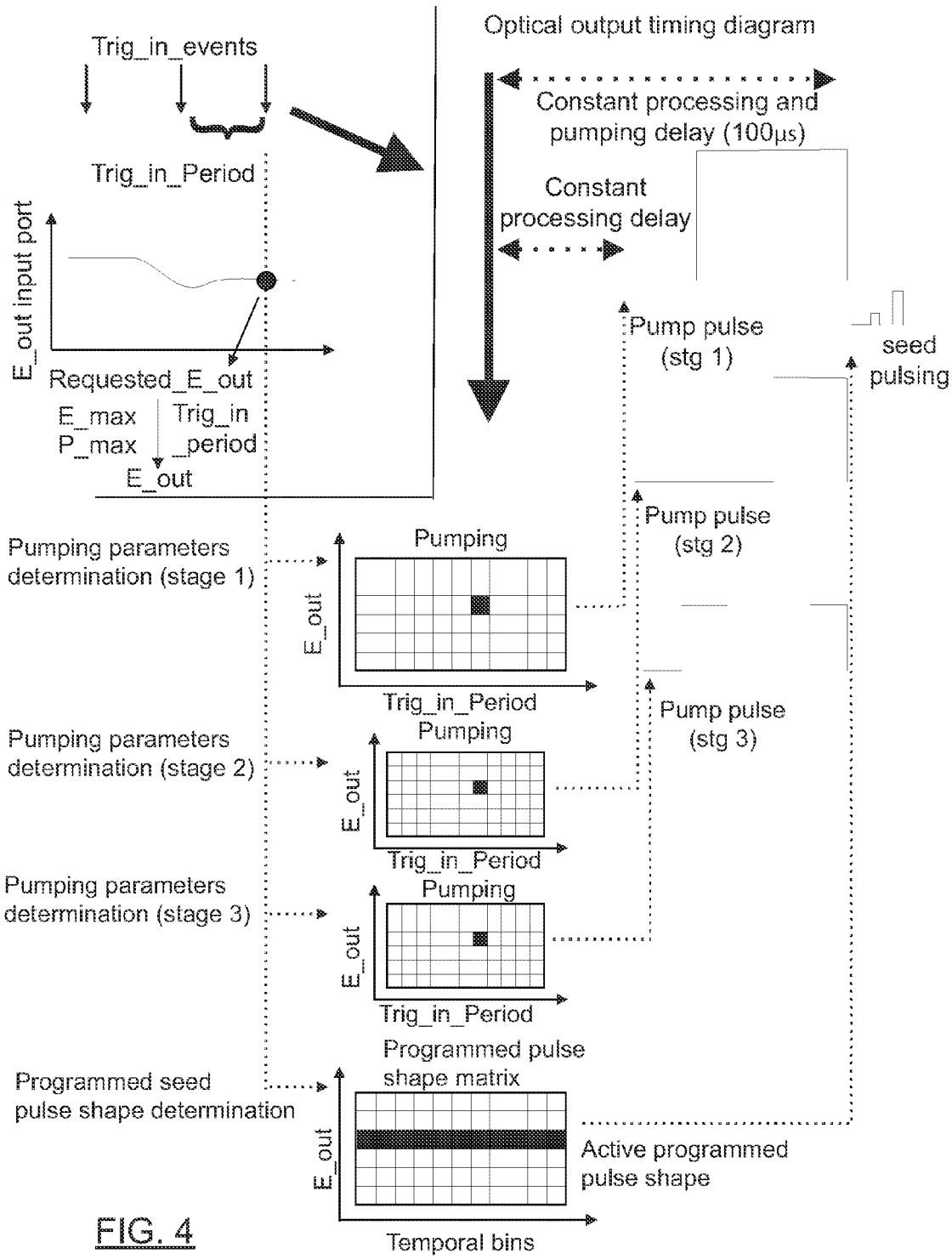
FIG. 4 schematically illustrates steps of a method for emitting optical pulses with constant pulse energy and waveform according to one embodiment.

FIG. 4 schematically illustrates some of the steps of a method according to one embodiment. This figure shows the sequence of events that preludes the emission of an amplified optical pulse with a desired output energy and output waveform according to one example.

First, the desired value of the output energy and the trigger signal are received. The trigger signal may define a plurality of trig events also referred to herein as trigger pulses, each corresponding to a desired output pulse. The desired output energy may be varied over time such that each trig event may have its own value of the desired output energy For each trigger pulse, the current value of the trigger period is measured, as well known in the art and explained for some embodiments further below.

For each of the amplification stage, the pumping parameters associated with the received desired value of the output energy and the current value of the trigger period of the received trigger signal are selected. For example, the trigger period and the desired output energy are used as indexes in the multidimensional pumping matrix to determine the appropriate values for the duration and amplitude of each pumping pulses for each amplification stage.

The method may further include determining a seed pulse waveform of the seed pulse based on a desired output waveform of the optical pulses and on the desired output energy. The desired output waveform can be provided as a further input to the controller or predetermined in the controller. The selected seed pulse waveform preferably has an appropriate level of gain saturation pre-compensation for outputting the desired seed pulse waveform.

The method next includes sending a pump pulse to each of the amplification stages according to the corresponding selected pump pulse parameters. The amplification stages are pumped simultaneously, with pumping pulses of appropriate durations and amplitudes prior to the seed signal emission. In some implementations, the pump pulses are synchronized to end simultaneously. For example, following each triggering event, a time delay implemented in the controller (100 µs for instance) may be predetermined for simultaneous pumping of the amplification stages prior to the emission of the seed pulse. Preferably, this time delay takes under consideration a constant processing delay which is usually very short (ns timescale) and correspond to time required by the electronics of the controller to perform its computations, and a pumping interval which is the maximum allowable time interval over which the pump sources can be activated prior to the seed emission given the current trigger period.

Finally, a seed pulse is launched from the seed laser oscillator for propagation through the amplification stages after their pumping. The launching is delayed for a predetermined delay after the trigger pulse is received, to allow the pumping of the amplifiers to take place. The seed pulse preferably defines the selected seed waveform and is emitted at the end of the pumping sequence. The seed pulse is amplified successively by each amplification stage to finally result in the desired output pulses at the end of the amplifying sequence.

If the same output pulse waveform is desired but at a different output energy (for example a 20-ns square pulse carrying 100 µJ of energy instead of 200 µJ), then a different seed pulse waveform may need to be selected (the gain saturation pre-compensation level will differ) and then accompanied by its corresponding pumping matrix values.

In other embodiments, the longest trigger period defined in the pumping matrix may be related to the fluorescent lifetime of the fiber used in the optical amplifiers. A typical value of this period would be 10 times the fluorescent lifetime. No residual inversion is present in the amplification stages at the beginning of each cycle for a laser system operating at such a low pulse repetition rate. Consequently, this is equivalent to a "single-shot" operation. If the measured trigger period is longer than this longest defined value, the system preferably uses the pumping conditions defined for this "longest trigger period".

It may be advantageous for the trigger period values used as an index in the pumping matrix to follow a logarithmic scale in order to cover adequately the full range of possible pulse repetition rate values, from 100 Hz to 1 MHz for example. The controller is preferably capable of generating the pump pulses while taking into account several parameters that include the last measured trigger period, the system-specific 100 µs time delay which encompass the pumping interval and the pump pulse duration obtained from the pumping matrix. The resulting pump signal applied to the pumps will vary accordingly.

Figure 5:
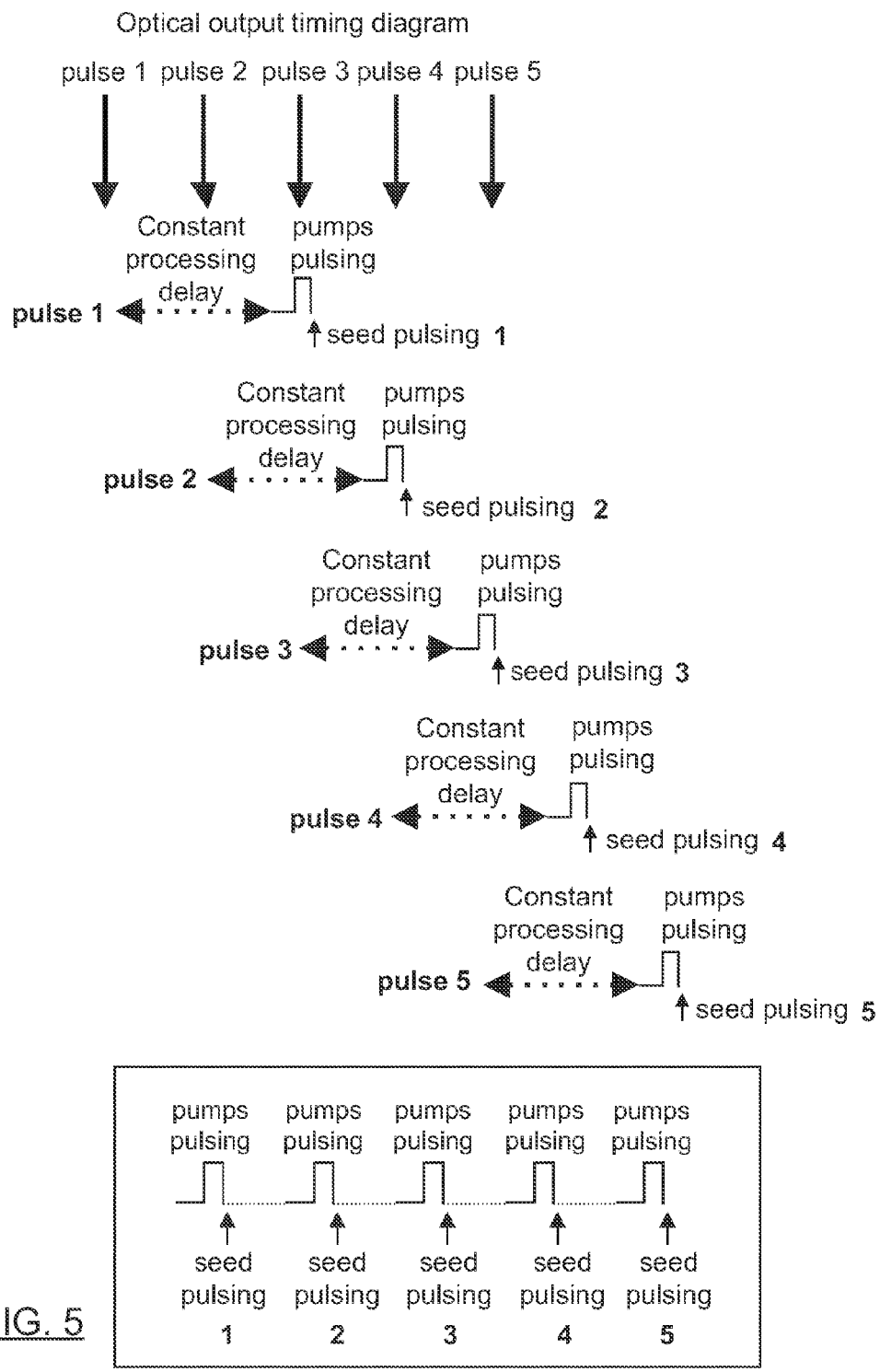
FIG. 5 shows a timing diagram of the pumping in FIG. 4 for the case where the pulse repetition rate is higher than the reciprocal of the pumping interval.

For example, FIG. 5 illustrates a simple case where the trigger period is shorter than the 100-µs time delay. This type of operation requires pipelining of the operations to be performed as the sequence of events associated with the generation of pulse #1 will not be finished before a subsequent trigger event (one or more) will arrive and start a new sequence of events for the generation of pulses #2, #3 and so on.

Figure 6:
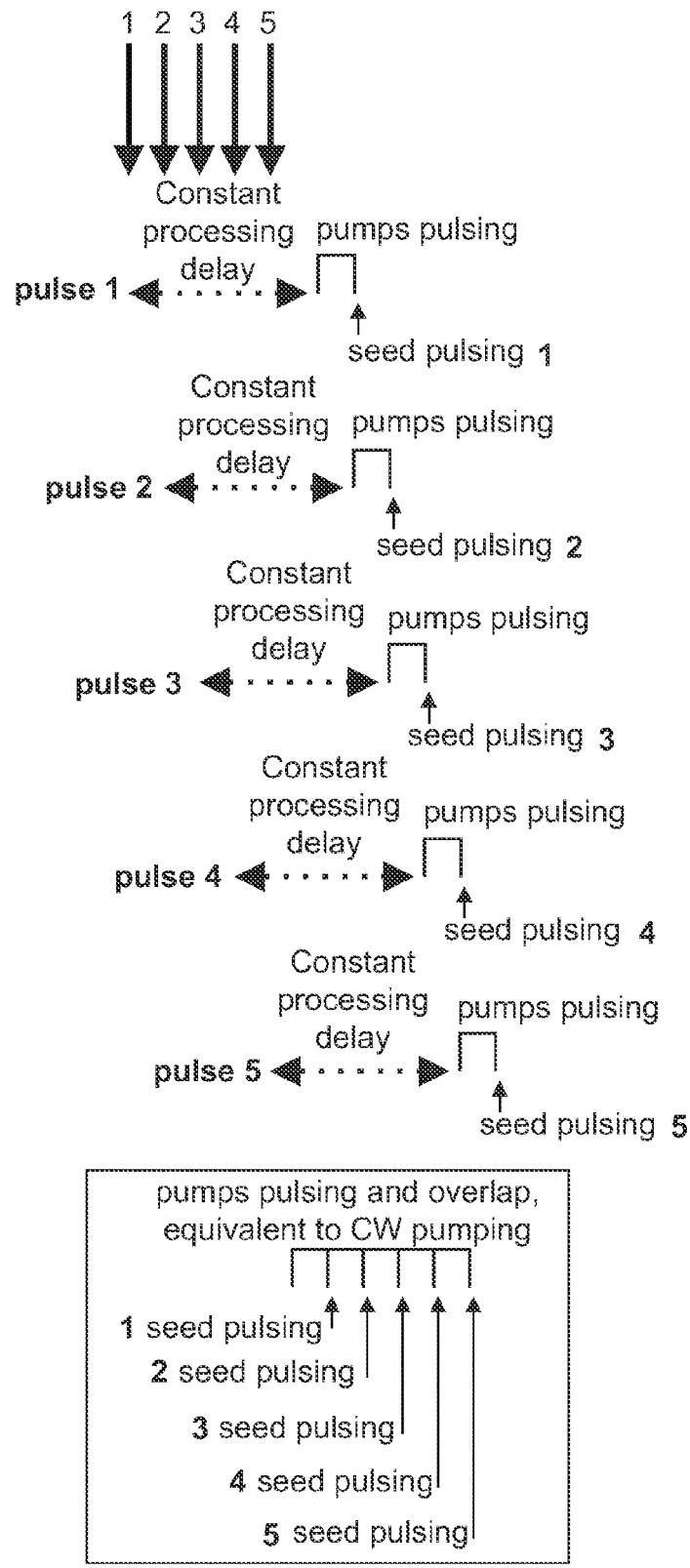
FIG. 6 shows a timing diagram of the pumping in FIG. 4 for the case where the pulse repetition rate is higher than the reciprocal of the minimum pumping pulse duration.

Furthermore, as illustrated in FIG. 6, the pulsed pumping is gradually switched to CW pumping by the controller when the external trigger period is decreased gradually so as to become shorter than the minimum pulse duration that can be generated by the system.

Figure 7:
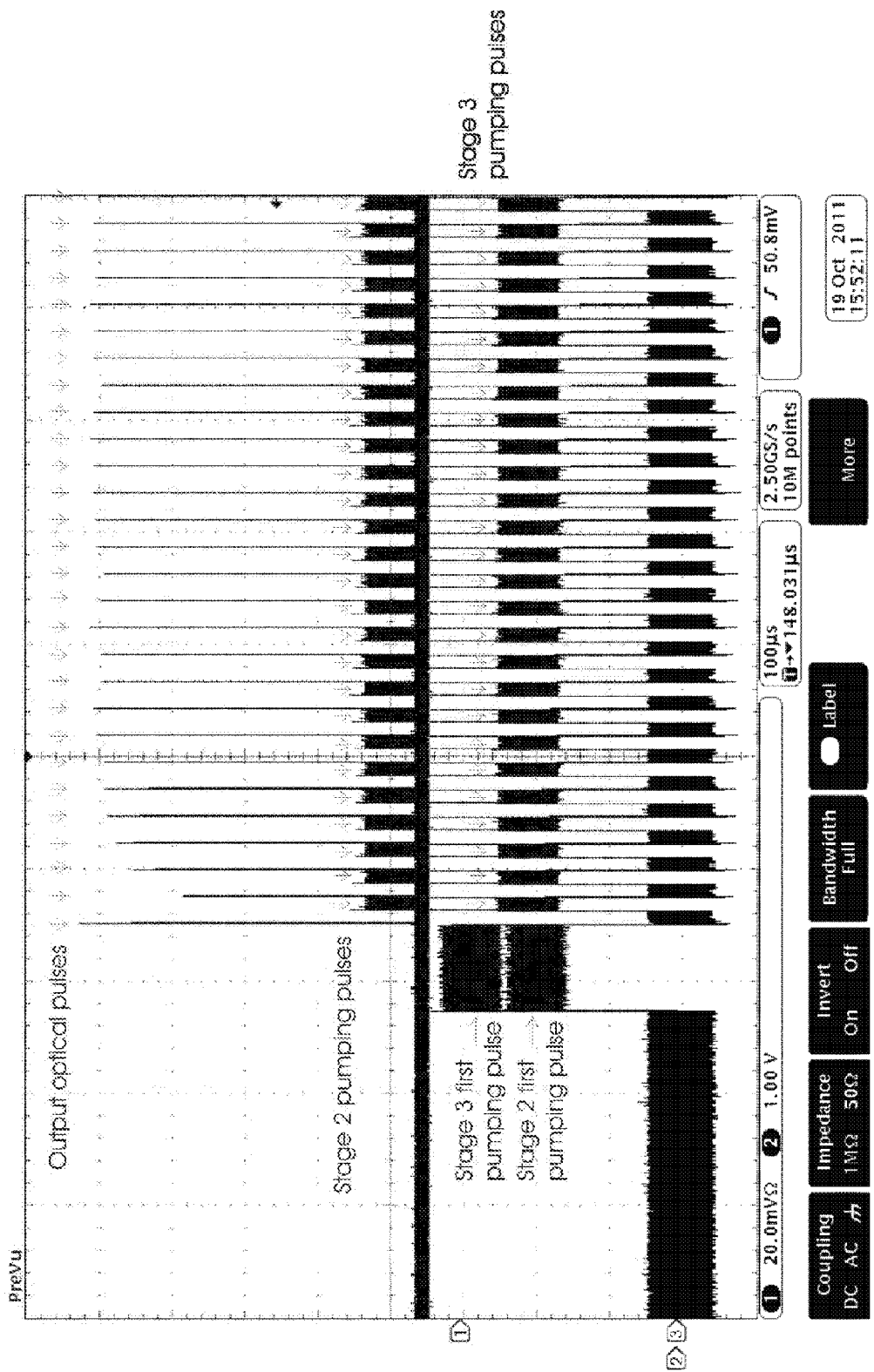
FIG. 7 illustrates the operation in burst regime of a laser system according to one embodiment. The indicated output optical pulses carry an energy of 600 µJ. The stage 2 and stage 3 pumping pulses illustrate the drive current variations required for the stage 2 and 3 pumps in order to maintain the output pulse energy constant.

Finally, FIG. 7 illustrates the output of such a laser system in response to a burst operation, defined herein as a burst of pulse trigger signals inputted to the laser system at a repetition rate of 42 kHz. As it can be observed in the figure, the first pulse carries the target output pulse energy while pulses 2 to 6 have a lower energy, recovering from an undershoot. The explanation for this behavior is that the system is using the pumping values associated with the longest trigger period for the first pulse while pulses 2 and subsequent have been generated using the pumping conditions associated with a trigger period of 23.8 µs (42 kHz). The pumping conditions for each pulse repetition rate are defined for a steady-state operation. Therefore, some smoothing, or damping function must be applied to account for the inertia of the system when the pulse repetition rate is varied rapidly or each time the laser emission is activated. Instead of making the choice of the appropriate pumping conditions solely on the most recent pulse trigger period, this choice can be based, alternatively, on the value of the pulse trigger period averaged over a time window of fixed duration (typically a fraction of the fluorescent lifetime of the fiber), like a moving average. This may provide improved performance in burst operation and on each enabling of the laser emission, and this will be described further below as we will detail the implementation of the Controller.

One skilled in the art will readily understand that laser systems adapted to carry out methods according to embodiments of the invention may be configured in a variety of manners. The section below presents, in a non-limitative fashion, examples of such configurations.

Laser Systems According To Embodiments

Referring again to FIG. 8, in accordance with one aspect, there is provided a laser system for emitting optical pulses in view of a desired value of an output energy thereof and an external trigger signal defining trigger pulses at a variable trigger period.

As mentioned above, the laser system 20 includes a seed laser oscillator 22 and one or more cascaded optical amplification stages 24, and therefore defines a MOPA architecture.

The seed laser oscillator 22 can be embodied by any appropriate laser source, such as, without being limitative, a pulsed semiconductor diode laser, a pulsed low-power fiber laser, a pulsed LED, a pulsed solid-state laser, a CW laser source, a LED or an ASE source coupled to an amplitude modulator, and the like. The seed laser oscillator is configured to emit a seed optical pulse according to a seed waveform upon reception of an external trigger signal.

Each amplification stage 24 includes a corresponding optical amplifier 26 including a gain medium, for example a rare-earth doped optical fiber of appropriate length, and a pump source 28. The pump source 28 provides optical pump energy to the amplifier 26 in order to generate a population inversion therein, thus providing the required optical gain. Each amplification stage 24 may have its own amplification gain and other characteristics, as will be readily understood by one skilled in the art. Again, as mentioned above, in other embodiments the laser system may include a different number of amplification stages 24 than the one shown in FIG. 8. In some embodiments, as lithe as a single amplification stage 24 may be provided.

The laser system includes a controller 30, which preferably receives the external pulse trigger signal, and for each trigger pulse measures the current trigger period and outputs, after a constant processing delay, a pump pulse control signal for each amplification stage. In some implementations, the controller 30 uses the current value of the trigger period in order to set the duration and amplitude of each pump pulse in view of the desired output energy and waveform of the output optical pulses and of the characteristics of the corresponding amplifier. In this manner, the right amount of energy can be provided at the right moment to the amplifiers so that the desired level of optical gain is present when a seed pulse emitted from the seed laser oscillator passes through each of them in cascade.

The controller 30 may include all of the electronics required for amplifying the pump control signals and to convert them into drive signals suitable for inputting to the optical pump modules depicted in the figure. Likewise, the controller 30 may provide adequate amplification of the waveform signal forwarded to the seed laser.

Figure 9A:
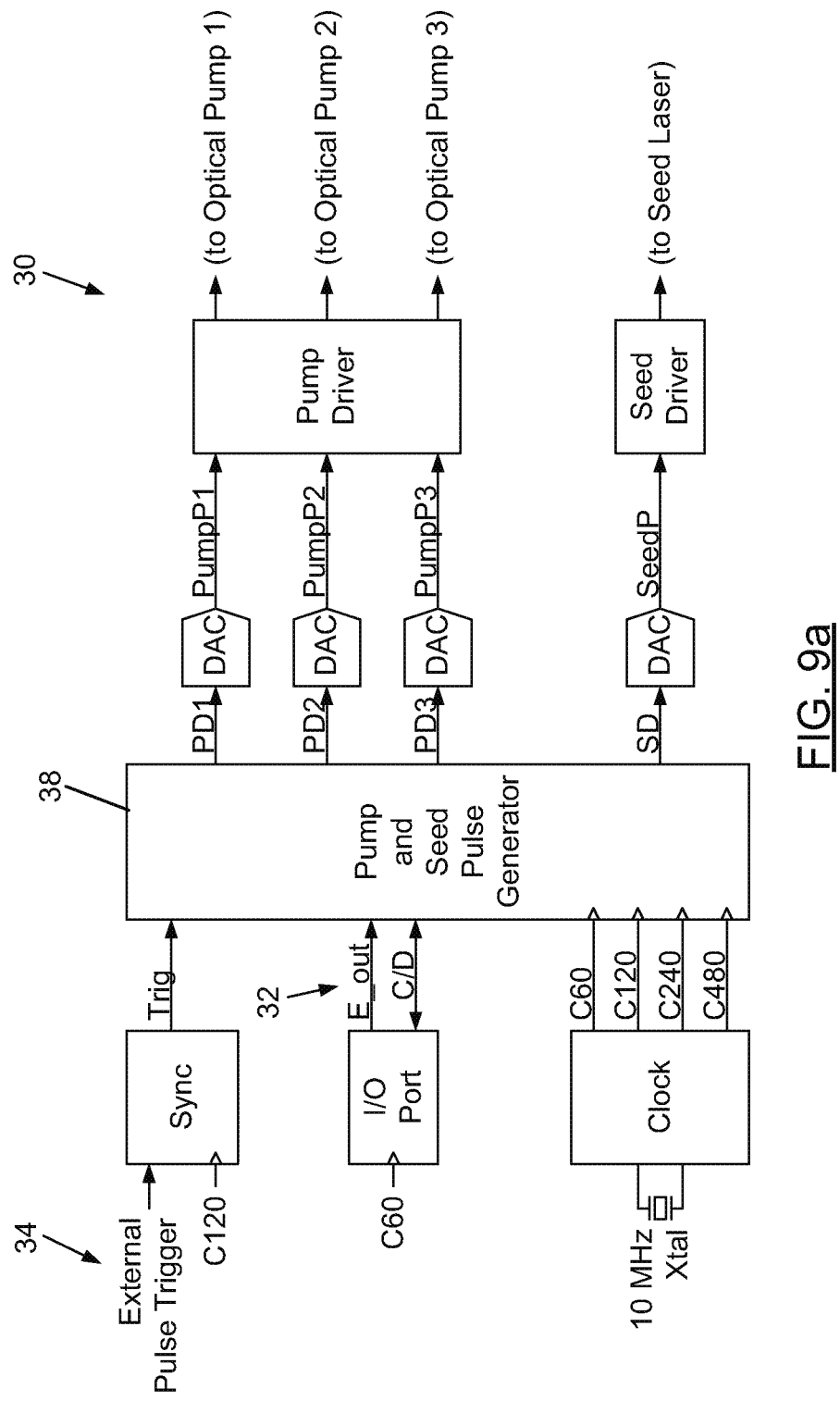
FIG. 9a is a high-level block diagram of a controller of a laser system according to an embodiment.

Referring to FIG. 9a, a high-level block diagram of a controller 30 according to one embodiment is shown. The controller 30 preferably includes energy and trig inputs 32, 34 for receiving the desired value of the output energy and the trigger signal, respectively. FIG. 9a shows the main functional elements that operate altogether in order to generate the pump and seed pulse signals synchronously with the received trigger signal "External Pulse Trigger" and at the energy level E_Out requested at the energy input. The controller of this embodiment is therefore is a two-input, four-output system. The signals received at the two inputs, External Pulse Trigger and E_out, are preferably digital and they are shown on the left part of FIG. 9a. The External Pulse Trigger can be as simple as a one-bit binary signal, while the E_out is preferably multi-bit, for example a six-bit word to allow the user to select E_out with up to $2^6=64$ different energy values. The four outputs are preferably analog signals that comprise the three power signals that drive each of the three pump lasers and the power signal that drives the seed laser. These outputs are shown on the right part of FIG. 9a. Between the inputs and outputs are functional groups extending from left to right. Each group produces some output that is input to the group immediately at its right.

Figure 9B:
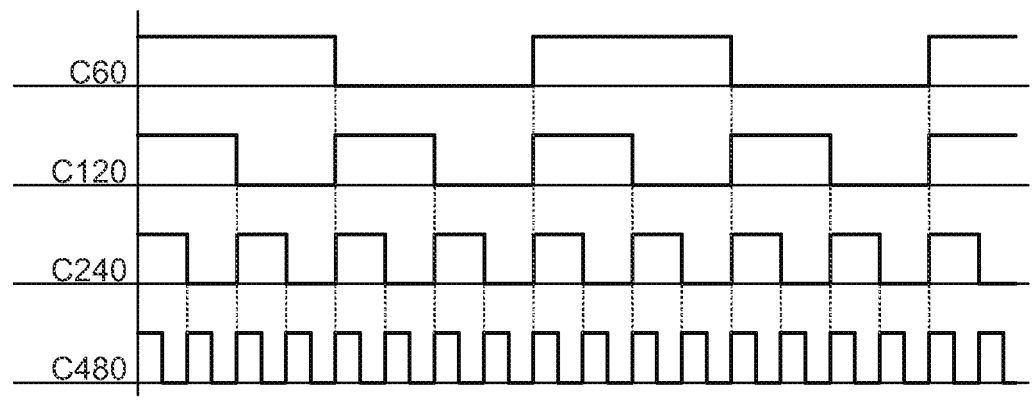
FIG. 9b is a timing diagram of a plurality of phase-related and frequency-related clock signals generated inside the controller of FIG. 9A.
Figure 9C:
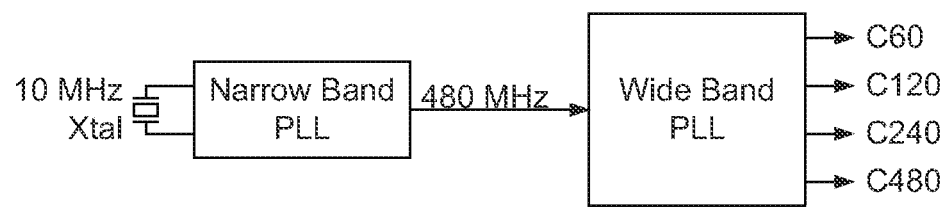
FIG. 9c illustrates an example combination of two Phase-locked Loop (PLL) components for the generation of the clock signals inside the controller of FIG. 9A.
Figure 9D:
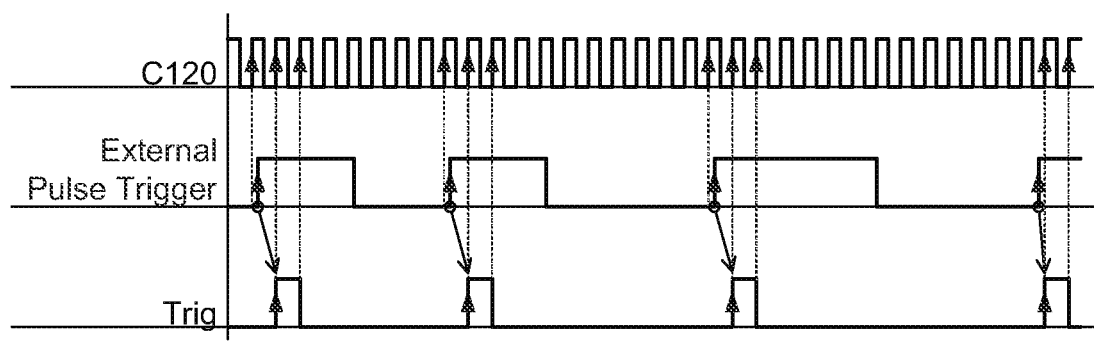
FIG. 9d is a timing diagram showing how a single-clock cycle TRIG pulse occurs synchronously with each rising-edge event of the External Pulse Trigger input.

The leftmost group comprises first a Clock module for the generation of a plurality of phase-related and frequency-related clock signals. Such clock signals are needed in this embodiment because the controller is designed as a synchronous system according to the current state-of-the art of digital electronics. Such system is very familiar to those skilled in the art. This implies, among other things, that if different subsystems of a synchronous system are to operate at different rates, then they should be clocked by signals that are phase-related and frequency-related. For the case of the controller, and as is shown in FIG. 9b, it can be convenient in some implementations to have a generator that will output frequency-related clock signals at 60, 120, 240 and 480 MHz. Consequently, these signals are named C60, C120, C240 and C480, respectively. FIG. 9c shows an example implementation of the Clock module. It first includes a 10 MHz crystal oscillator whose frequency is a reference input to a narrow-band PLL (Phase-Locked Loop) for generating a low-jitter, 480 MHz signal. This signal is further input to a multi-output wideband PLL that generates the divided-down clock frequencies. As shown on FIG. 9b, the clock signals are generated with edges always coincident, which is typical of phase-related signals. Since the pump and seed pulses must be generated synchronously with the incoming External Pulse trigger, FIG. 9a shows that this group also includes a Sync module. Referring to FIG. 9d, the purpose of the Sync module is to synchronize the triggering events occurring on the External Pulse Trigger input with one clock in the Controller, and consequently, with all other clocks therein. A triggering event is defined herein as any occurrence of a rising-edge of the External Pulse Trigger, although those skilled in the art are aware that a triggering event could be defined equivalently as a falling edge, or according to other conventions. Hence, and as shown in both FIG. 9a and FIG. 9d, the 120 MHz, C120 clock is used to generate a single-cycle Trig pulse out of every rising edge that occurs in the External Pulse Trigger input.

The controller 30 preferably includes a trigger period counter (see FIG. 11b). A relatively high degree of precision may be preferred in performing such a measurement of the trigger period, as the pump control scheme relies heavily on this information. Referring to FIG. 9d, the period of the External Pulse Trigger can be measured simply by counting the number of clock cycles between two consecutive Trig pulses. However, if the first trigger event of the External Pulse Trigger input occurs immediately after a rising edge of the C120 clock signal, the first Trig pulse is output almost one C120 cycle later, meaning that one count will be missing in the total count. Consequently, the precision of such counter-based measurement will improve as the clock frequency of the counter is increased with respect to the highest repetition frequency attainable by the External Pulse Trigger. Since it has been mentioned earlier that the external trigger frequency might be as high as 1 MHz, measuring its period at a frequency of 120 MHz is acceptable in practice.

Referring back to the leftmost group shown in FIG. 9a, in the illustrated embodiment an input/output I/O port is provided as the entry point for the E_out command. This port can be implemented in many ways, for example, a simple rotary switch, or a user-interface control panel mounted in front of the enclosure of the laser system. It can also be part of a more elaborate digital system embedded altogether with the fiber laser in a single enclosure. In this case, the controller may operate as a slave peripheral that executes the E_out command under control of a local processor or any other similar bus master. The local processor or bus master may itself operate as a slave that executes commands received from a remote computer or from other user equipment. As shown in FIG. 9a, the I/O port may therefore include some kind of control/data, like the CID interface shown. Such an interface may be used, for example, to program, or re-write new pumping matrices and seed pulse waveforms in the laser system. This can be performed either during factory calibration, or at system startup, or dynamically in the course of operation of the laser system. Typically, an I/O port is conveniently clocked at a frequency of a few tens of megahertz, like the 60 MHz, C60 clock signal shown in FIG. 9a.

Still in the illustrated embodiment, the leftmost group of modules shown in FIG. 9a provides synchronized clocks and control inputs to the group at its right, which has been illustrated as a single block identified as a Pump and Seed Pulse Generator 38. This Generator 38 contains the pump matrices data, the seed shape data as well as the control intelligence to output the appropriate pump and seed pulses corresponding to the E_out input value and the Trig input period. The Pump and Seed Pulse Generator 38 preferably outputs the pump and seed pulses as sequences of digital data words to a group of digital-to-analog converters (DAC's) that are shown in FIG. 9a at the right of the Generator 38. For each of the three optical amplification stages as well as for the seed laser, there is provided a DAC that receives a specific sequence of words from the Pump and Seed Pulse Generator 38. The data sequences are identified distinctly in FIG. 9a as PD1, PD2 and PD3 for the pumps, and SD for the seed laser, respectively.

The amplitude data sequences are outputted by the Pump and Seed Pulse Generator 38 to the DAC's according to well-defined timings that will be described in paragraphs below.

As outlined above, the group of DAC's shown in FIG. 9a includes one dedicated DAC for each of the optical pumps. The analog, low-power pump pulse DAC outputs shown therein, namely PumpP1, PumpP2 and PumpP3 are input to the following Pump Driver stage. The Pump Driver stage amplifies each of the pump pulse inputs so that a peak electrical power of, typically, a few tens to a few hundred watts can be delivered, as requested, to the optical pump lasers. Similarly, the controller 30 preferably includes a Seed Driver for amplifying the seed pulse signal SeedP that is output by the associated seed DAC in order to deliver the appropriate power level to the seed laser.

Figure 10:
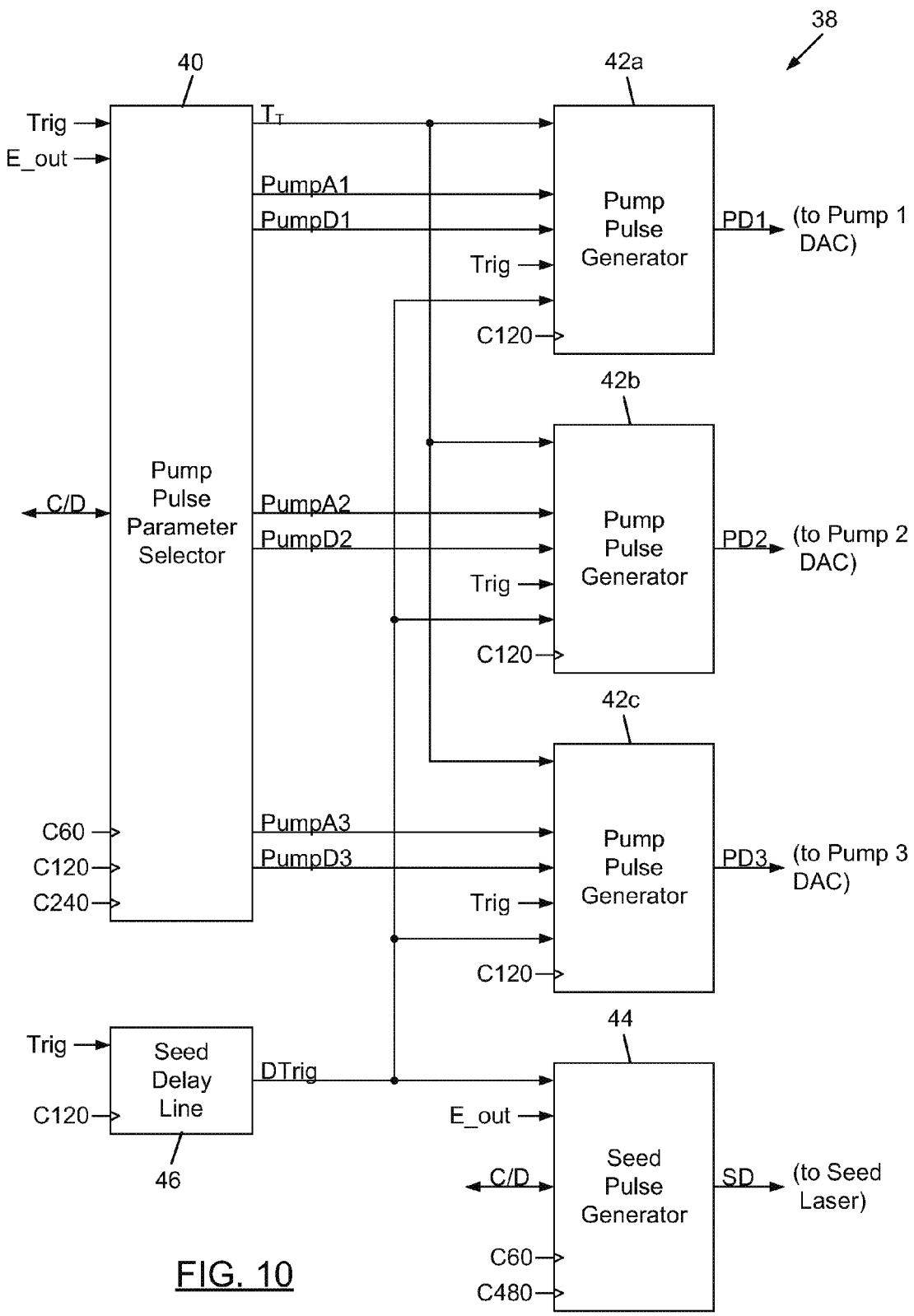
FIG. 10 is a block diagram of the Pump and Seed Pulse Generator implemented inside a controller according to an embodiment.

Referring to FIG. 10, there is shown the internal structure of the Pump and Seed Pulse Generator 38 according to one implementation. It includes a Pump Pulse Parameter Selector 40, a plurality of pump pulse generators 42a, 42b and 42c, and a Seed Pulse Generator 44. Preferably, a Seed Delay Line 46 is also provided. The Seed Delay Line is used to provide a time delay, typically of 100 µs, during which the amplification stages are pumped prior to the emission of the seed pulse. The Pump Pulse Generators 42a, 42b, 42c in order to drive as many pump sources as there are optical amplification stages in the laser system. Since the example laser system embodiment discussed herein comprises three amplification stages, three instances of the Pump Pulse Generator are shown in FIG. 10.

In the illustrated embodiment, the functional behavior of the components in the Pump and Seed Pulse Generator 38 is completely determined by the Trig and E_out inputs. The Pump Pulse Parameter Selector 40, for instance, uses both inputs to output the value $T_T$ of the last measured Trig period and simultaneously, the corresponding PumpA pulse amplitude and PumpD pulse duration for a given Pump Pulse Generator. Hence, on each Trig event, a ($T_T$, PumpA, PumpD) data set is input to each of the instances of the Pump Pulse Generator 42. In FIG. 10, it can be seen that the instances of PumpA and PumpD are indexed from one stage to the other so as to emphasize the fact that any given amplification stage in the laser may, at any moment, be energized differently from the other stages. The PumpD duration variable is preferably encoded as an integer number of clock cycles. For example, and as illustrated in FIG. 10, each Pump Pulse Generator 42 is clocked preferably at the rate of 120 MHz by the C120 clock signal. The minimum value allowed for PumpD is preferably non-zero. For example, a pump pulse may be allowed to be as short as 700 ns, or equivalently, 84 cycles of the C120 clock. The maximum pump pulse duration, denoted as MaxD, is equal to the delay line value $T_P$ minus one period of C120 clock. Hence, for $T_P$=100 µs, PumpD can be as high as MaxD=11999. It is acceptable in practice to define pumping matrices with, for example, 256 different duration values taken in the interval of the minimum 84 cycles to MaxD=11999. On the other hand, the PumpA amplitude variable may take either a zero value or one of a plurality of non-zero values. For example, PumpA may take any value between 0 and 255, and consequently, it is encoded in an 8-bit word. As shown in FIG. 10, each stage-specific Pump Pulse Generator 42 uses its dedicated input sequence of ($T_T$, PumpA, PumpD) data sets to determine an output PD data sequence. This sequence comprises pulse amplitude data words that occur at appropriate instants in order to be converted to an analog pulse signal by a downstream DAC.

The Pump Pulse Parameter Selector 40 includes, for each of the amplification stages, a plurality of sets of pump pulse parameters. Each set is associated with specific values of the output energy and the trigger period. The Pump Pulse Parameter Selector 40 is configured to select, for each of the amplification stages, the one of the sets of pump pulse parameters associated with the received desired value of the output energy and the trigger period of the received trigger signal.

Figure 11A:
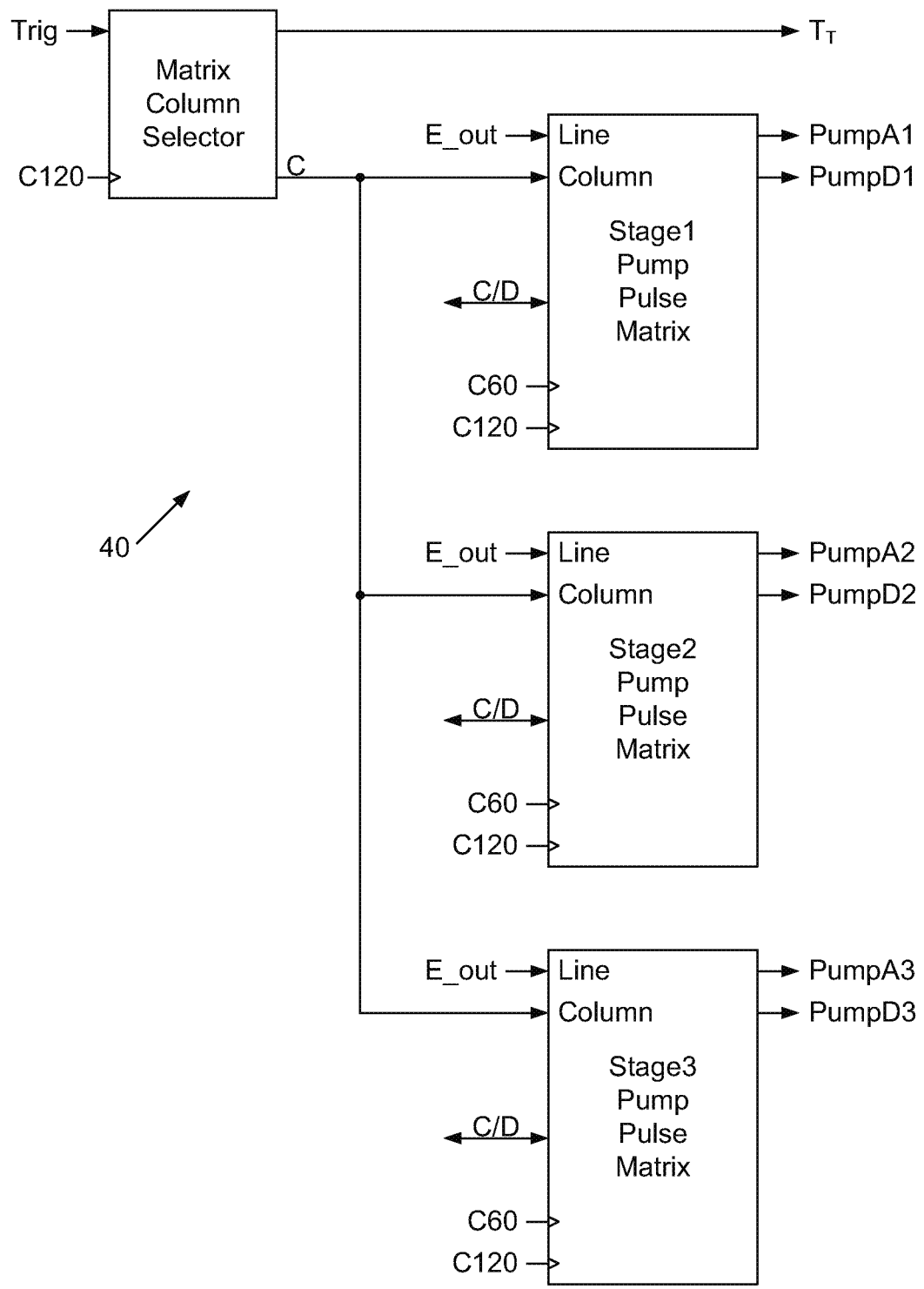
FIG. 11a is a block diagram of the Pump Pulse Parameter Selector of the Pump and Seed Pulse Generator of FIG. 10.

Referring to FIG. 11a, the architecture of a Pump Pulse Parameter Selector 40 according to one implementation is shown. In order to generate a sequence of ($T_T$, PumpA, PumpD) data sets for each of the optical amplification stages, the Pulse Parameter Selector includes a matrix of (PumpA, PumpD) data for each stage. Any data set (PumpA, PumpD) stored in a matrix is associated with unique values of the pulse energy E_Out and of the Trig period $T_T$. Consequently, the (PumpA, PumpD) data sets can be stored in a matrix so that the E_Out value selects a given line in the matrix while a column is selected according to the value $T_T$ of the incoming Trig period. Therefore, and as shown in FIG. 11a, the Pump Pulse Parameter Selector 40 also includes a Matrix Column Selector whose purpose is to output at each Trig event the measured value $T_T$ of the Trig period and simultaneously, a column value C corresponding to this $T_T$ value. As it was pointed out above, 256 different pulse duration values PumpD can be sufficient. Consequently, it can be sufficient that C vary between 0 and 255. On the other hand, the Trig events may happen arbitrarily in time and there is necessarily a practical upper bound to the period value $T_T$ that can be measured. For example, with Trig frequencies varying possibly in the interval of 100 Hz to 1 MHz, a counter capable of counting up to 1200000 should be provided if it is assumed that this counter is clocked by the C120 clock signal, Moreover, Trig events may happen at frequencies much lower than 100 Hz and possibly, at so low a frequency that one may consider that the laser should be capable of operating in single-shot mode. Consequently, the Matrix Column Selector is preferably designed so that for Trig events occurring at frequencies less than or equal to 100 Hz, the Matrix Column Selector will output the maximum allowed period value $T_T=1200000$ altogether with the maximum allowed column value C=255.

Figure 11E:
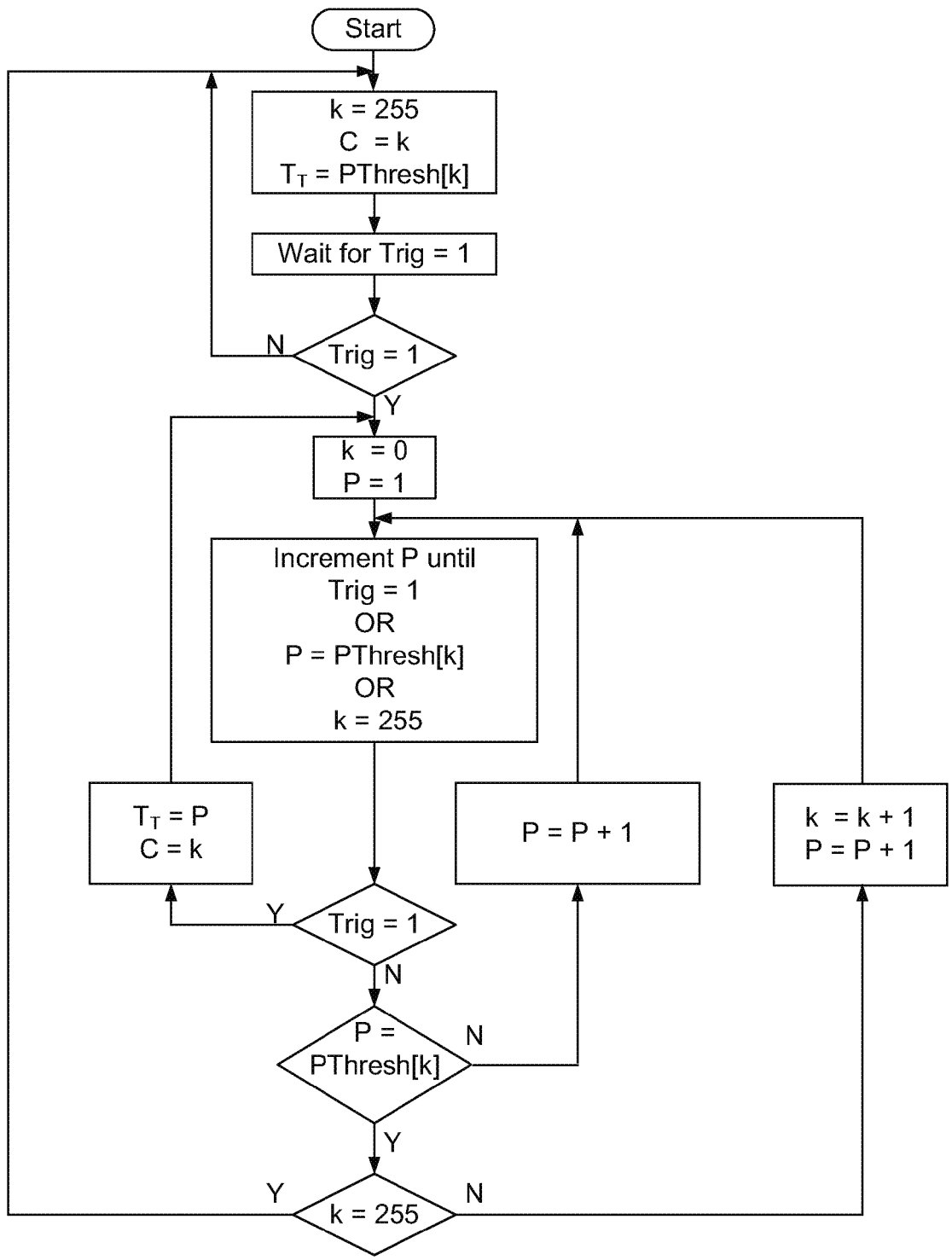
FIG. 11e is a sequential flowchart illustrating the operation of the Control Logic implemented in the Trig Period Counter.

The considerations in the paragraph above will be better understood with reference to FIG. 11b to FIG. 11e. FIG. 11b illustrates a block diagram of the Matrix Column Selector including the Trig Period Counter 36 and a Period Threshold Look-Up Table (LUT). On each Trig event, the Trig Period Counter 36 outputs a Trig period measure $T_T$ of the last period measured and an accompanying column value C. FIG. 11c shows the internal structure of the Trig Period Counter 36. It includes a Control Logic module, a P-Counter and a k-Counter. As illustrated in FIG. 11e, the Control Logic starts increasing both counters when a first Trig event occurs after system startup. Increasing these counters is kept ongoing after the first Trig event depending on whether a subsequent Trig event occurs, or the P counter value reaches the PThresh [k] output value of the LUT, or the column value reaches k=255, The values of the $T_T$ and C outputs are then latched simultaneously according to which of these three alternatives occurs first. As depicted in FIG. 11d, the Period Threshold LUT contains 256 count values, each representing a number of cycles of the C120 dock. The counter value 120 is associated to k=0, corresponding to the highest frequency of the Trig signal measured, namely 1 MHz, and whose period totalizes 120 cycles of the C120 clock. At the opposite, the counter value 1200000 is associated to k=255, corresponding to the 100 Hz, lowest frequency measured. For values between k=0 and k=255, period values are chosen that increase exponentially with k and preferably according to equation (5):

$$PThresh[k]=120\times(2^{k(log_210000)/255}), k=0, 1, 2, \ldots, 255 \quad (5)$$

Equation (5) uses the 256 increasing values of k to determine uniquely 256 period values that are also increasing and exponentially equally spaced over the 14 octaves between 100 Hz and 1 MHz. Consequently, with the increasing counting scheme defined here for the period $T_T$ measured by the P-Counter, and the column value C latched to C=k from the k-Counter, the (PumpA, PumpD) data sets should be arranged in the matrices so that the pump pulse duration PumpD increases with C. Hence, C=0 selects the shortest pulse duration defined for the highest 1 MHz Trig frequency while C=255 selects the longest pulse duration PumpD=MaxD=11999 associated with the lowest 100 Hz Trig frequency.

FIG. 11e further illustrates the sequential flowchart and the decision rules that apply to fix the value of $T_T$, the column value C=k, and consequently, the (PumpA, PumpD) data sets for each stage. At system startup, no Trig event has occurred yet, so C=k=255, $T_T$=PThresh[k]=PThresh[255]=1200000. Therefore, when the first Trig event occurs, each stage-specific data set read out of the matrices has the value:

(1200000, PumpA[E_Out, 255], PumpD[E_Out, 255].

Since no pumping has occurred previously, $T_T$=1200000 and the pulse duration data in the pump matrices is set at maximum duration PumpD[E_Out, 255]=MaxD=11999 in order to provide maximum pump energy to the gain medium. This is shown in the example of FIG. 7 as the first pumping event lasts for approximately 100 μs. Hence, the first Trig event following system startup is processed as if the Trig period would be 1200000 or higher. As shown in the flowchart of FIG. 11e, the Trig Period Counter first clears k=0 and resets P=1 after the first Trig event and then starts counting while waiting for another Trig to occur. Thus, k=0 selects the shortest pump duration as if the Trig period is expected to be no more that 120 dock cycles. If a Trig event occurs before Count=PThresh[0]=120, then the C and $T_T$ outputs are latched respectively to C=k=0 and $T_T$=P. Consequently, the stage-specific data sets:

($T_T$, PumpA[E_Out, 0], PumpD[E_Out, 0])

are outputted by the Pump Pulse Parameter Selector. Immediately after, counting resumes, but with k cleared to k=0 and the P counter reset to P=1. Otherwise, counting continues until a Trig event happens or P is equal to the LUT output with value PThresh[k]=PThresh[0]=120. If no Trig event occurs and P reaches P=PThresh[0]=120, k is incremented to 1, and counting continues until either a Trig event happens or P=PThresh[1]=124. It should be clear then that counting continues and k increments until either a Trig event occurs or k reaches k=255. If a Trig events occurs before k reaches k=255, then C and $T_T$ are latched respectively to C=k and $T_T$=P. Consequently, the stage-specific data sets ($T_T$, PumpA[E_put, C], PumpD[E_Out, C])

are outputted by the Pump Pulse Parameter Selector. Immediately after, counting resumes, but with k cleared to k=0 and P reset to P=1. On the other hand, if no Trig event occurs and k reaches k=255, then the Trig Period Counter returns to the initial system startup state with k=255, C=k=255 and $T_T$=PThresh[k]=1200000.

The (PumpA, PumpD) data sets in the pumping matrices are pre-determined assuming that the measured $T_T$ period has reached a steady state. On the other hand, as was mentioned above, the laser system may be required to operate in conditions where the Trig period may vary abruptly, as shown in FIG. 7. It is well known that any stable physical system, when submitted to abrupt input changes, will show some characteristic transient behaviour determined by its own dynamics while transitioning from one equilibrium state to another. This is the case in FIG. 7, where the laser system exhibits some undesirable transient variability in the optical output pulse amplitude when it is forced to transition from rest state to a steady, active pulse generation regime at 42 kHz. Like for many other controlled physical systems, typical pulsed laser applications may require that such transient variability be dampened as much as possible and that it lasts for as short a time as possible. Still in reference to FIG. 7, if abrupt transitions in the (PumpA, PumpD) output sequences of the Pump Pulse Parameter Selector are somewhat dampened, or smoothened in time, then the variability observed in the amplitude of the optical output pulses should be smoothed consequently.

Figure 12A:
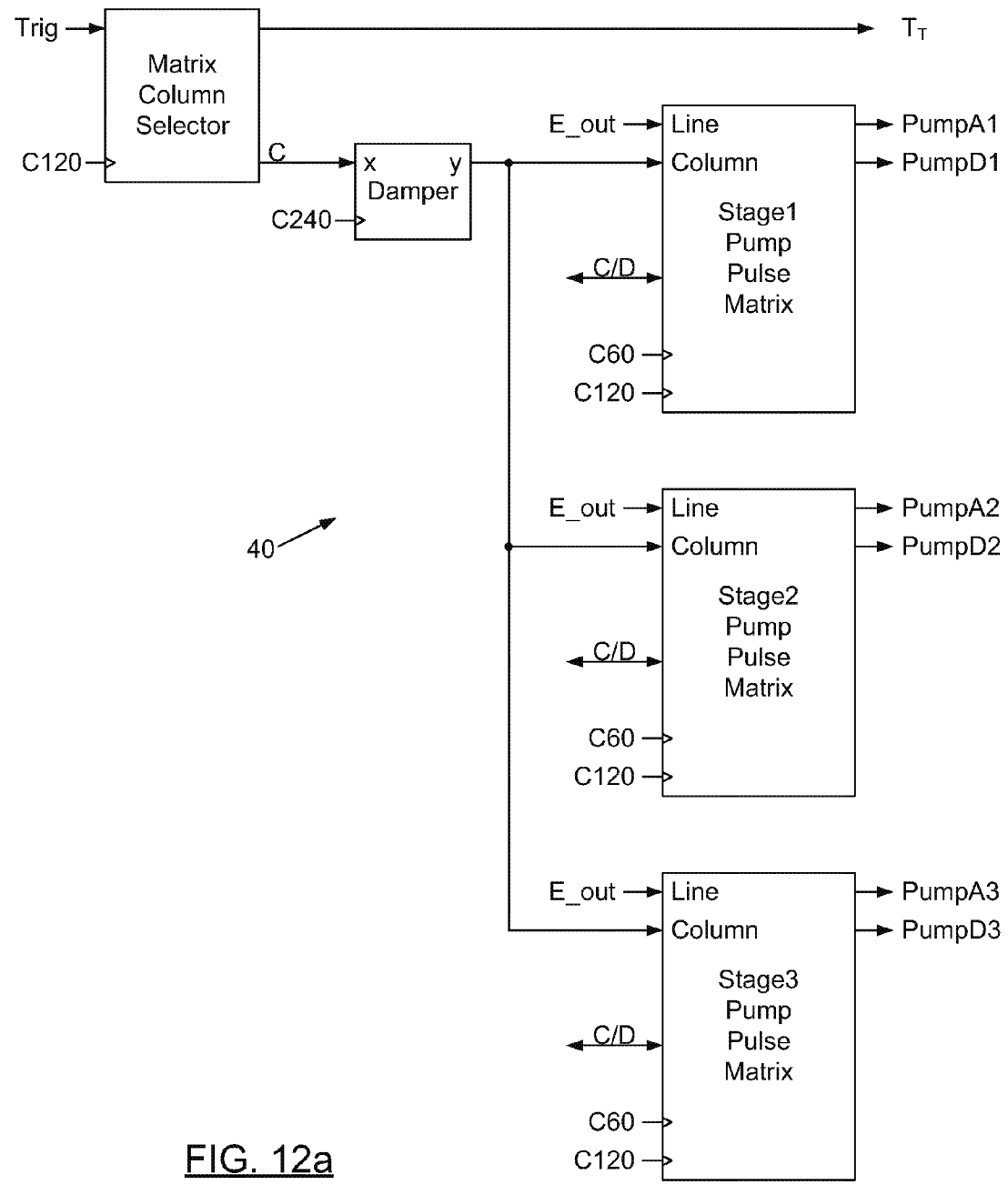
FIGS. 12a to 12d show variants of the Pump pulse Parameter Selector of FIG. 10, incorporating a Damper in one or more location.
Figure 12B:
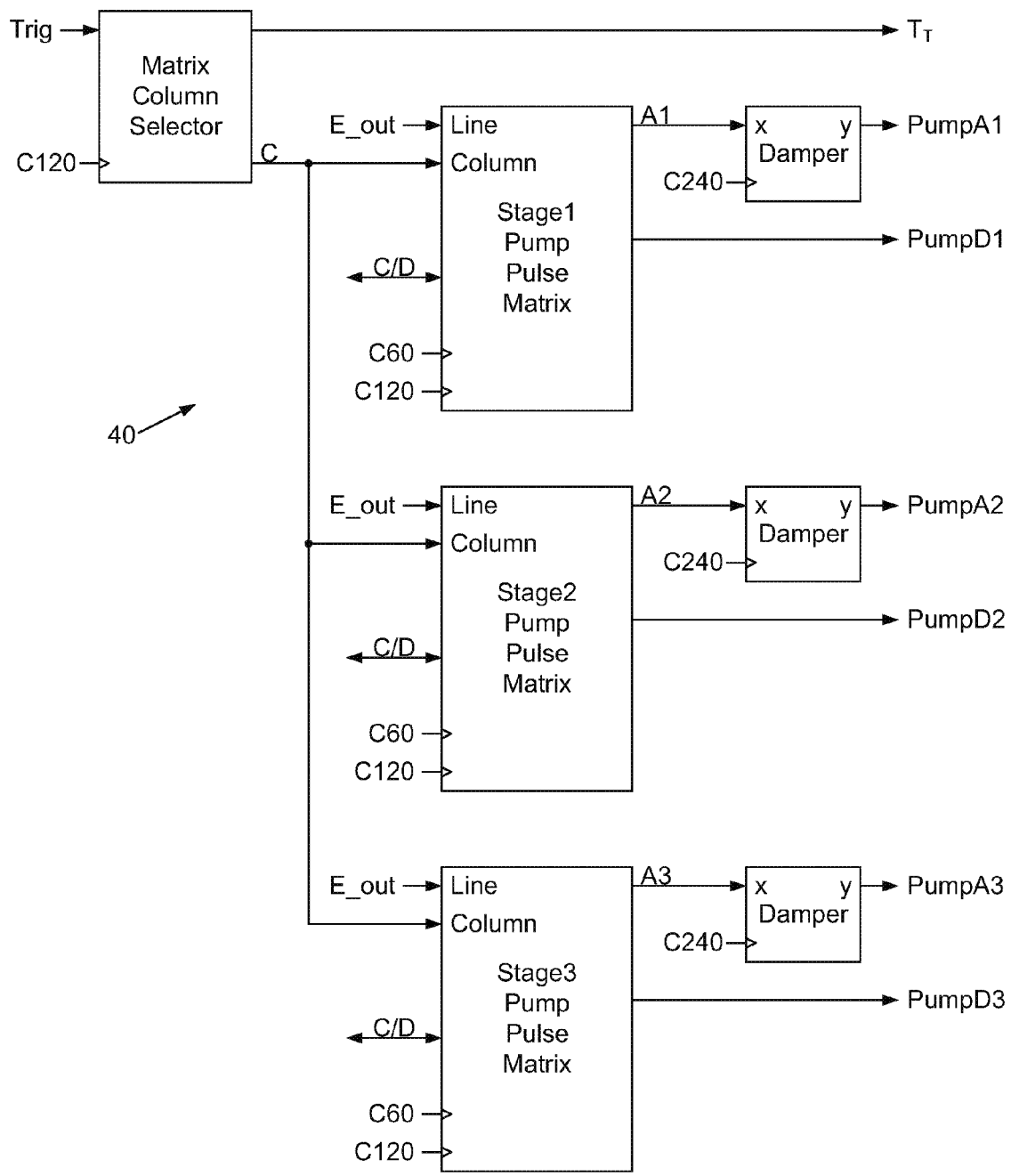
Figure 12C:
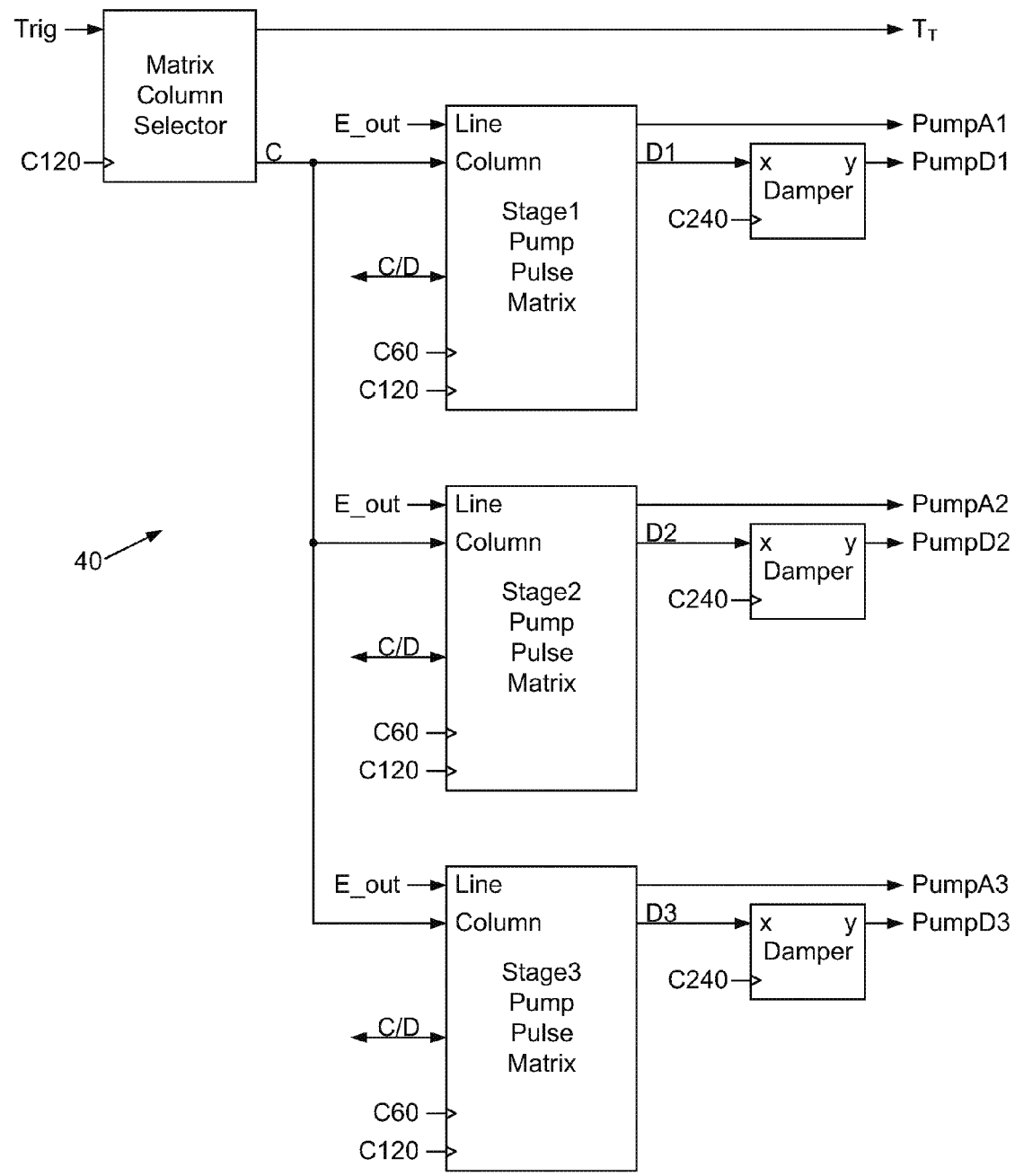
Figure 12D:
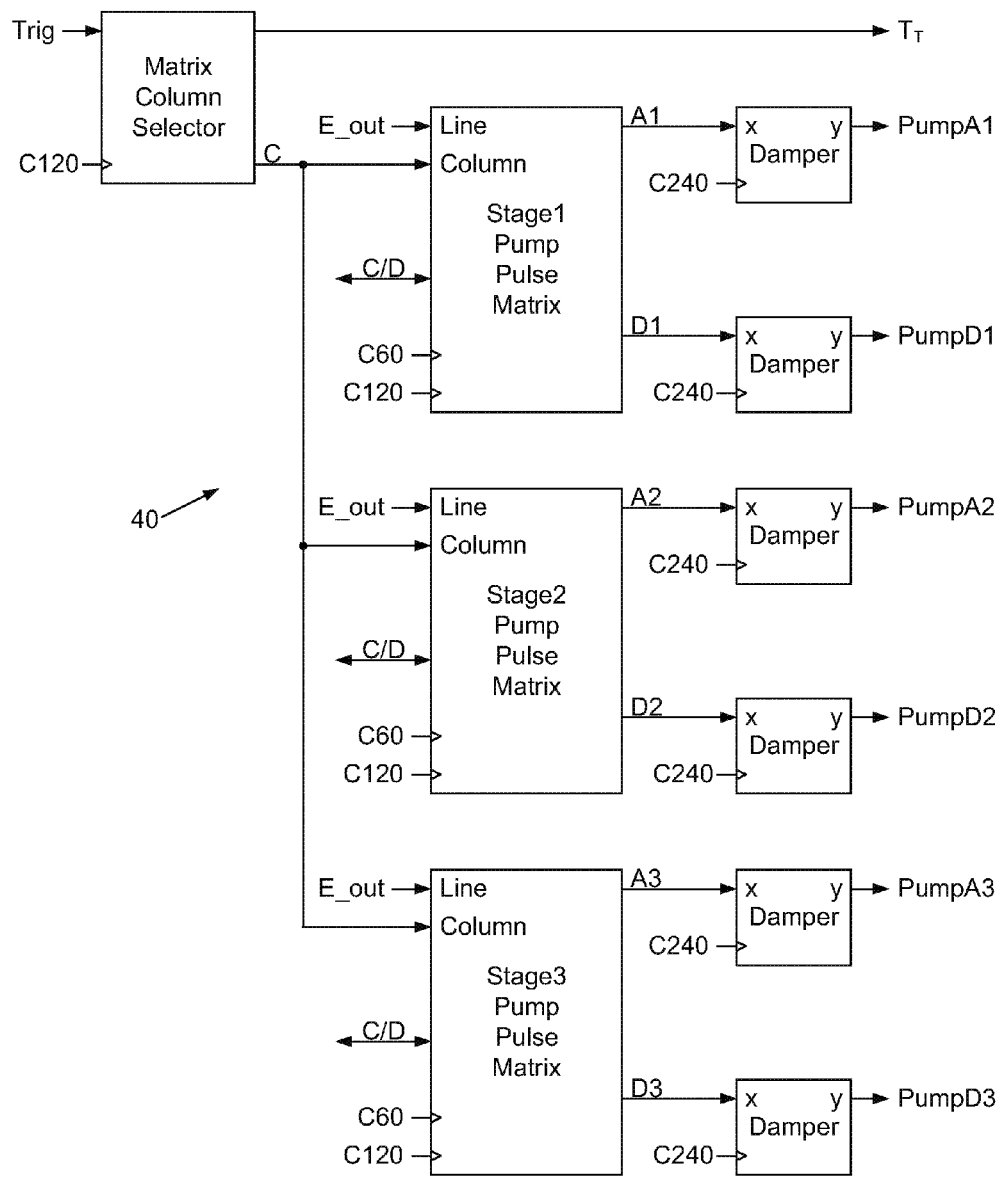
Figure 12E:
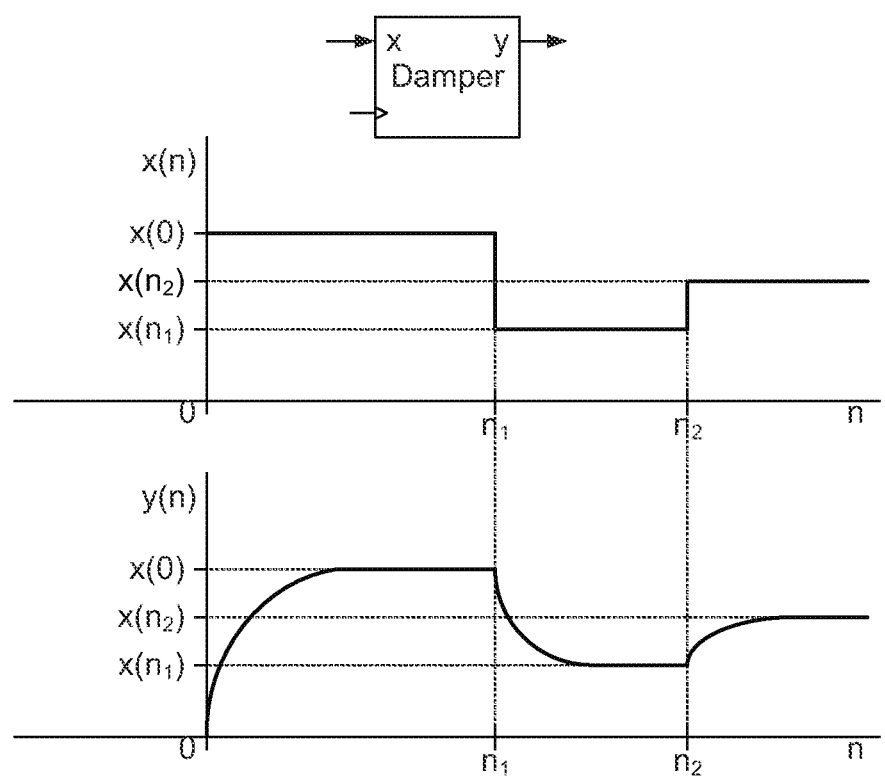
FIG. 12e depicts the stepwise sequence x as input to the Damper and the desired smoothed-out output response y.

FIG. 12a shows a block diagram of a variant of the Pump Pulse Parameter Selector 40 where, with respect to the block diagram in FIG. 11a, a Damper component is added to dampen the abrupt changes in the sequence of the C column values. Dampening abrupt changes in the sequence of the C values should consequently dampen abrupt changes of both amplitude and duration encoded in the (PumpA, PumpD) data sequences read out of the pumping matrices. Alternatively, as illustrated in FIG. 12b to FIG. 12d, a Damper component can be provided to dampen individually and possibly, according to different timing parameters, one or both of the PumpA and PumpD output sequences of the pumping matrices. But whatever the alternative chosen for the location of the Damper component, it should be noted that any of C or PumpA or PumpD normally changes stepwise since these quantities are updated from one Trig event to the other. Thus, the dynamics of the damper is preferably such that the output is able to catch up with step variations occurring at the input. This is illustrated in FIG. 12*e* where a sequence x(n) with steps occurring at n=0, n=n$_1$ and n=n$_2$ is inputted to the desired Damper. The damper is preferably capable of outputting a sequence y(n) where the abrupt step changes that occur in x at n=0, n=n$_1$ and n=n$_2$, are slowed down. It must also be capable to reach after some time the same input step values x(0), x(1), x(2) that occurred in the input sequence.

Those familiar with the dynamics of physical systems, and most particularly with the discrete-time systems, are well aware that implementations of the Damper as described above may be chosen among a large class of systems found in the broader class of linear shift-invariant (LSI) systems. For any system in this class, the output sequence y is related to the input sequence x according to the general equation:

$$\sum_{k=0}^{N} a_k y(n-k) = \sum_{r=0}^{M} b_r x(n-r) \qquad (6)$$

LSI's are treated extensively in the literature. LSI's described by equation (6) and for which N>0 are said to be Infinite Impulse Response (IIR) LSI's. On the other hand, LSI's for which N=0 are said to be Finite Impulse Response FIR systems. The Damper can be implemented either as an IIR or an FIR but, whatever the implementation chosen, the output sequence y should be capable of catching up with a stepwise input x such as the one shown in FIG. 12*e*.

In the following paragraphs, some candidate implementations of the Damper are presented. As depicted in FIG. 12*a* to FIG. 12*d*, it is supposed that the sampling clock of the Damper is the 240 MHz, C240 clock for all implementations. Therefore the sampling period T an be defined and denoted as T=1/(240×10$^6$). In order to illustrate and to compare the dynamic behaviour of the respective implementations, the output y(n) is represented on a graph for each implementation, supposing that the input is a unit step sequence x(n)=1, n≥0; x(n)=0 otherwise. It is also supposed that a sequence of length Ns of samples of the unit step input x(n) is input to each of the implementations. For example, in reference to FIG. 7, it can be seen that the transient in the amplitude of the optical pulses lasts for about 200 µs. Thus, for that laser system, Ns=(200×10$^{-6}$)/T=48000 input samples. However, those skilled in the art of system dynamics are aware that the coefficients a$_k$'s and b$_r$'s appearing in the equation (6) fully characterize any implementation of an LSI. Consequently, these coefficients can be related in one way or the other to some normalized fraction (Ns/k), k being an integer, of the number Ns of input samples. Said otherwise, the absolute value of Ns is rather immaterial or insignificant with regards to the behaviour of the output y as long as a relation is defined and maintained between a given set of a$_k$'s and b$_r$'s and a given fraction (Ns/k) of Ns. The practical consequences of such considerations will appear more clearly in the examples below. In order to show that each example implementation of the Damper is capable of catching up with a stepwise input sequence such as in FIG. 12*e*, it will be explained first for each case how the general formula in equation (6) is reduced to an implementation-specific formula with its characteristic coefficients a$_k$'s and b$_r$'s. Secondly, a closed-form equation will be given showing explicitly that the output y(n) converges to 1 when the input is the unit step sequence x(n)=1 for every n≥0.

Figure 13:
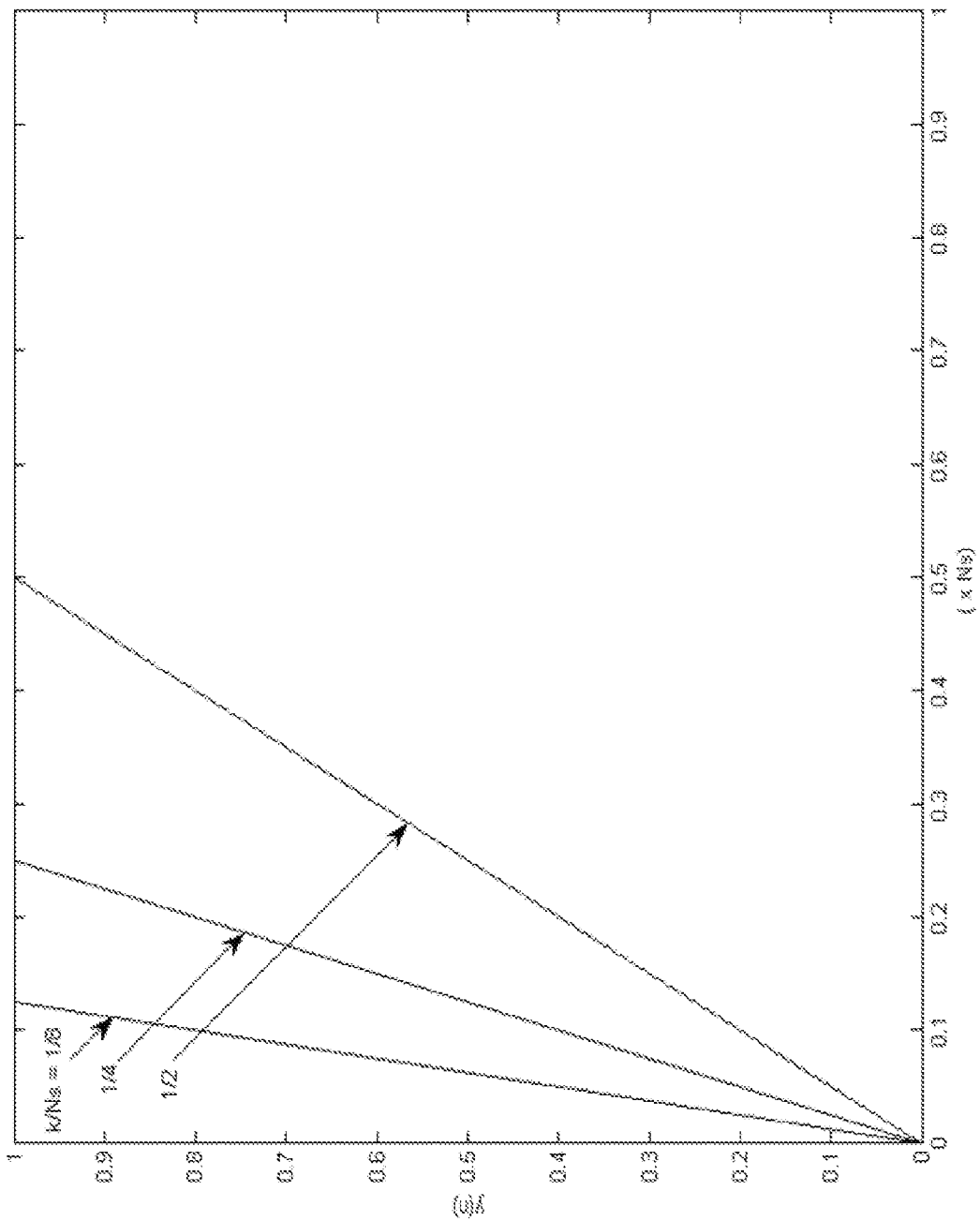
FIG. 13 is the graphic plot of the unit step response of a moving average FIR for three values of its characteristic parameter.

The first example is a Damper defined as a moving-average FIR system. In this case, the current output value y(n) is the average of the current value and the M−1 past values of the input sequence x(n). For this system, equation (6) is reduced to:

$$y(n) = \frac{1}{M} \sum_{r=0}^{M-1} x(n-r), n \geq 0 \qquad (7)$$

the characteristic equation of a moving-average system. Here, N=0, and the M coefficients b$_0$, b$_1$, . . . b$_{M-1}$ all have the same weight (1/M). It is seen from this equation that for a unit step input x(n)=1, n≥0, the output y increases linearly from y(0)=(1/M) to y(M−1)=1 and that y(n)=1 for n≥M. Thus, this moving-average FIR Damper is capable of catching up with a stepwise input. M can be normalized as a fraction Ns/k, k being an integer. Thus, as was indicated above, whatever the absolute value of Ns, the transient behaviour of the output y has always the same duration (Ns/k) relative to the duration of the Ns-sample segment. This is clearly illustrated in FIG. 13 where the unit step response values y(n) computed with equation (7) are plotted on a graph for three different values of M=(Ns/8), (Ns/4) and (Ns/2) and with respect to the horizontal axis scaled in terms of fractions of Ns.

A second example implementation of the Damper is achieved using the well-known impulse invariance method by which a discrete-time system can be defined from a continuous-time system. The differential input-output relation for a first-order, continuous-time system can be expressed as:

$$\frac{1}{\tau} \frac{dy(t)}{dt} + y(t) = Kx(t) \qquad (8)$$

Such a system is characterized by the constants and K that appear the equation (8). The impulse invariance method leads to the discrete-time version of a continuous-time, first-order system, as defined by the input-output relation:

$$y(n) = \frac{KT}{\tau} x(n) + \exp\left(-\frac{T}{\tau}\right) y(n-1), n \geq 0 \qquad (9)$$

Equation (9) keeps the characteristic constants of the continuous-time system of Equation (8), but it also includes the sampling period T since, for a discrete-time system, time is "normalized away". Note that equation (9) is a simplification of the general LSI equation (6) for a first-order HR system with N=1, a$_0$=1, a$_1$=(−exp(−T/τ)), M=0 and b$_0$=KT/τ. With a proper choice of the constant K and if x(n)=1 for n=0, n=1, . . . , is substituted repeatedly in equation (9), the following closed form expression of the unit step response is obtained:

$$y(n) = \frac{KT}{\tau} x(n) + \exp + \left(-\frac{T}{\tau}\right) y(n-1), n \geq 0 \qquad (10)$$

Figure 14:
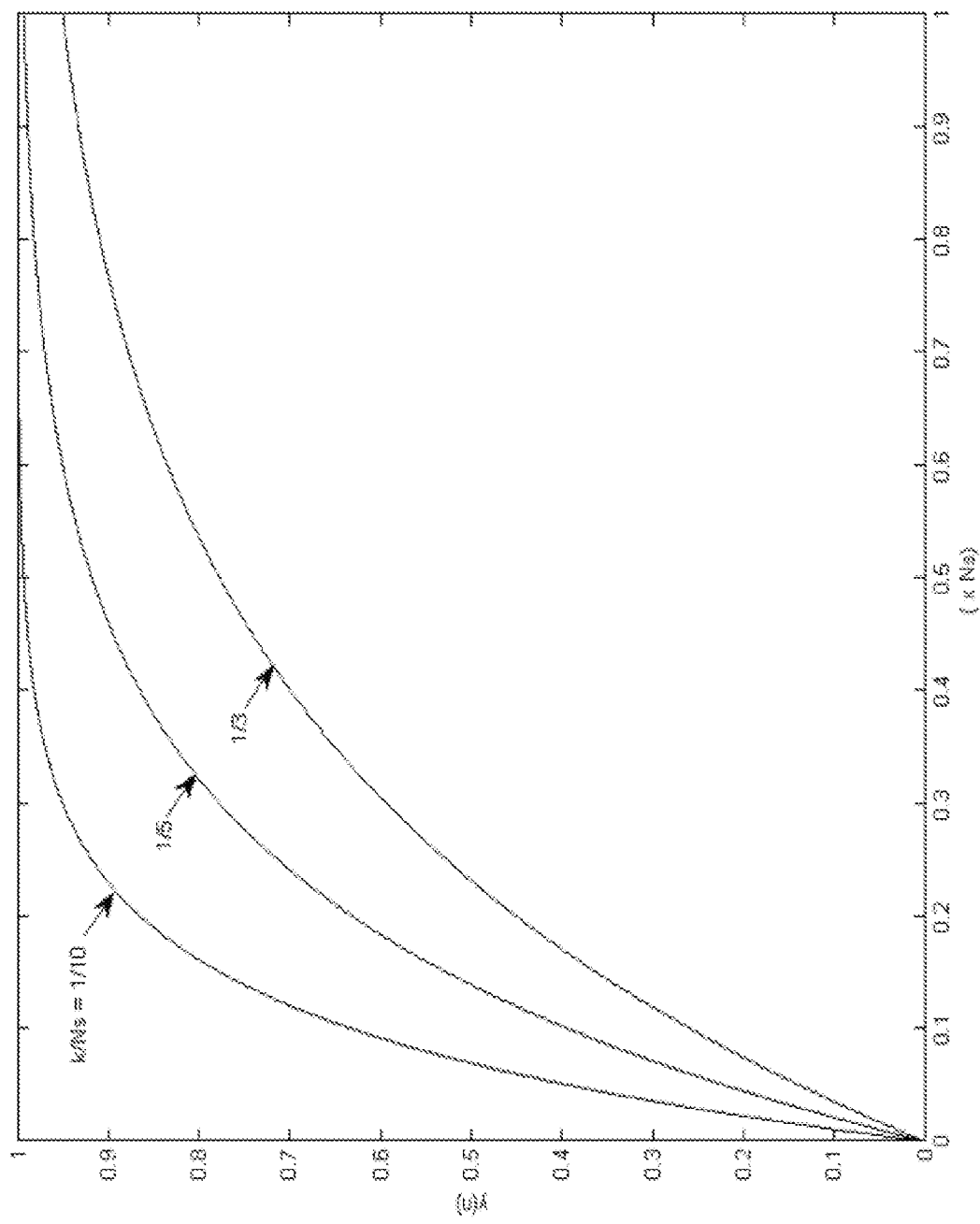
FIG. 14 is the graphic plot of the unit step response of a first-order IIR LSI for three values of its characteristic parameter.

It is seen from equation (10) that the exponential term decreases to 0 as n increases towards infinity. Thus, the unit step response converges to 1 and this Damper is capable of catching up with a stepwise input. For any given Ns and T, we can define τ=(NsT/k), i.e., relative to a fraction of Ns. This determines the coefficients in equation (9) and it enables to plot the values of the unit step response of equation (10) in terms of fractional values (k/Ns). This is shown in FIG. 14 for (k/Ns)=1/10, 1/5, and 1/3.

Another example implementation of the Damper is can be made by applying the impulse invariance method to the second-order, continuous-time system defined by the differential input-output relation:

$$\frac{1}{\omega_n^2}\frac{d^2}{dt^2}y(t) + 2\frac{z}{\omega_n}\frac{d}{dt}y(t) + y(t) = Kx(t), z > 0, \omega_n > 0 \quad (11)$$

Equation (11) shows that three constants to characterize a second-order implementation can be obtained, namely K, z>0 and $\omega_n$>0. With respect to the K and ω constants for the first-order system discussed above, the availability of an additional constant in a second-order system provides a supplementary degree of freedom for characterizing the system, Those familiar with system dynamics are aware that equation (11) leads to a Laplace-domain system transfer function that has two poles denoted here as $p_{1,2}$. The poles $p_{1,2}$ are related to the constants z and $\omega_n$ according to the equation:

$$p_{1,2} = -z\omega_n\sqrt{z^2-1}, z \geq 1 \quad (12)$$

Equation (12) shows that the poles can be real or complex conjugate, depending on whether z≥1 or z<1. Although the Damper can be defined with either z≥1 or z<1, the discussion here will be restricted to the case z≥1. Applying the impulse invariance method to the second-order, continuous-time system equation (11) results in a discrete-time, second-order IIR LSI with an input-output relation:

$$y(n) = \left(\frac{K\omega_n T(\exp(p_1 T) - \exp(p_2 T))}{2\sqrt{z^2-1}}\right)x(n-1) \ldots \ldots + \quad (13)$$
$$(\exp(p_1 T) - \exp(p_2 T))y(n-1) - \exp(p_1 T + p_2 T)y(n-2), n \geq 0$$

With a proper choice of the constant K and if x(n)=1 is substituted repeatedly for n=0, n=1, . . . , in equation (13), the following closed form expression of the unit step response y(n) is obtained:

$$y(n) = 1 - a_1(\exp(p_1 T))^n + a_2(\exp(p_2 T))^n, n \geq 0 \quad (14)$$

where the constants $a_1$ and $a_2$ are defined according to:

$$a_1 = \left(\frac{(1-\exp(p_2 T)\exp(p_1 T) + (1-\exp(p_1 T))(1-\exp(p_2 T)\exp(p_2 T - p_1 T)}{(\exp(p_1 T) - \exp(p_2 T))}\right) \quad (15)$$

$$a_2 = \left(\frac{(1-\exp(p_1 T)\exp(p_2 T) + (1-\exp(p_1 T))(1-\exp(p_2 T)\exp(p_1 T - p_2 T)}{(\exp(p_1 T) - \exp(p_2 T))}\right) \quad (16)$$

Figure 15:
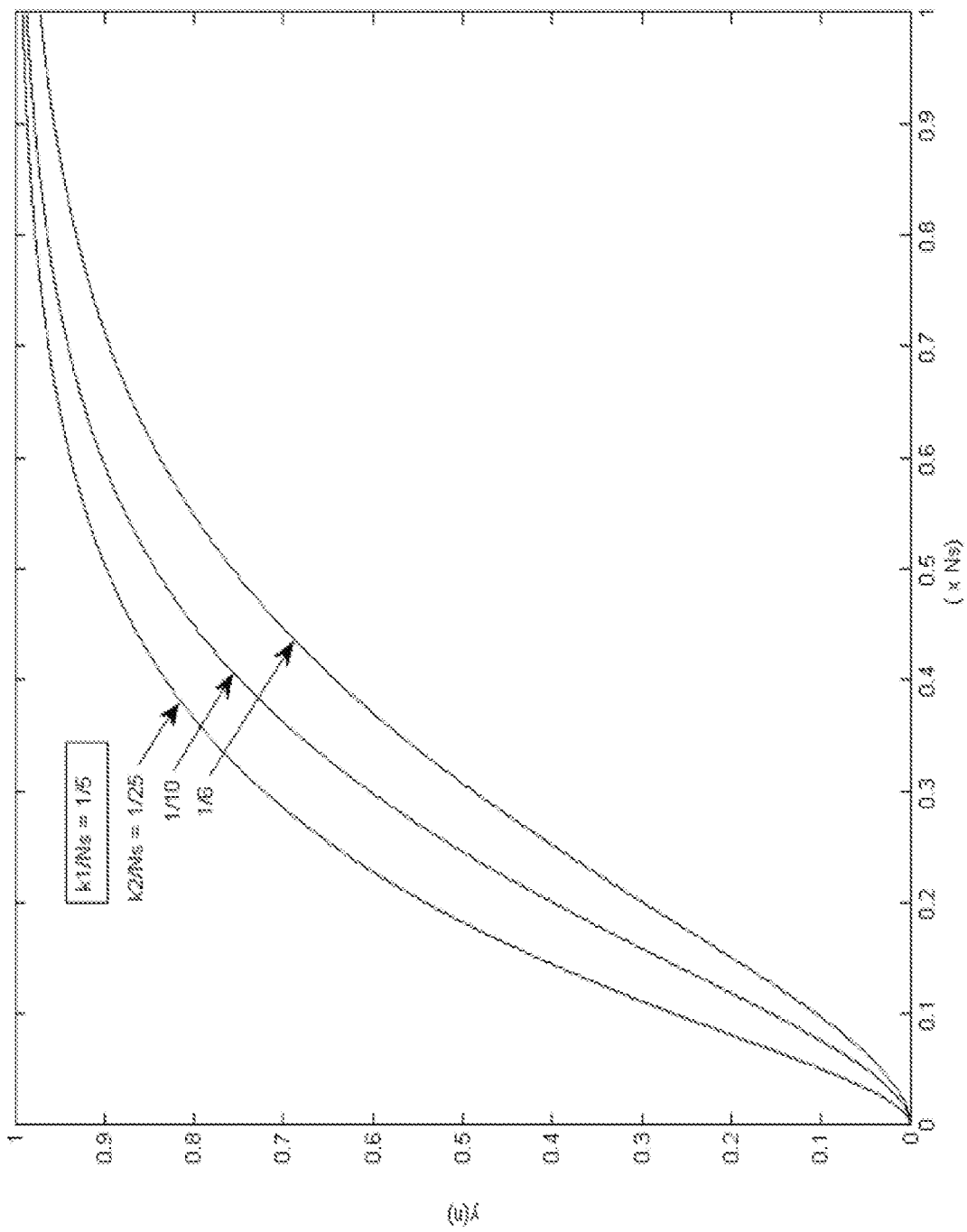
FIG. 15 is the graphic plot of the unit step response of a second-order IIR LSI for three values one of its characteristic parameters.

Equation (4) also contains an exponential term for each of the poles $p_1$ and $p_2$. Since the constants z and $\omega_n$ are positive by definition, equation (12) imply that $p_1$ and $p_2$ both have negative values and hence, each exponential term equation (14) vanishes with increasing n. Thus, the unit step response converges to 1 and this Damper is capable of catching up with a stepwise input. For a given Ns and T, we can define $p_1$=(-$k_1$/NsT), $p_2$=(-$k_2$/NsT), where 0<$k_1$<$k_2$, and from this, equation (12) can be used to calculate z and $\omega_n$. Then, all the coefficients in the system equation (13) can be determined. Since $p_1$ and $p_2$ are defined as fractions of Ns, the values of the unit step response equation (14) can be plotted. This is shown in FIG. 15 for ($k_1$/Ns)=1/5, and $k_2$/Ns=1/6, 1/10 and 1/25.

Referring back to FIG. 10, as mentioned above the controller 30 may include a delay line 46 configure to provide a time delay to the pump pulse generators 42 and the seed pulse generator. Preferably, the pump pulse generators 42 send the corresponding pump pulses during the time delay, and the seed pulse generator 44 launches the seed optical pulses after this time delay.

It will be recalled that the values of C and $T_T$ are updated at each Trig event, and therefore, that an updated ($T_T$, PumpA, PumpD) data set is output by the Pump Pulse Parameter Selector at each Trig event and for each amplification stage. On the other hand, every Trig event at the input of this delay line 46 is output to the seed pulse generator as DTrig after a fixed time interval of $T_P$ second. This delay line is provided to allow for simultaneous pumping of the amplification stages during, for example, $T_P$=100 μs, and prior to the emission of a seed pulse. The operation is further illustrated in FIG. 16, which shows that whatever the time interval separating consecutive Trig events, either shorter or longer than $T_P$, every Trig event travels through the delay line and occur $T_P$ sec. later at the DTrig output, and in the same order it happened in the sequence of events at the input. The $T_P$ delay line is preferably implemented digitally. Thus, when it is clocked by the 120 MHz, C120 clock, as shown in FIG. 10, the delay line 46 should include 12000 single-cycle delay taps in order to produce a delay $T_P$=100 μs.

Figure 16:
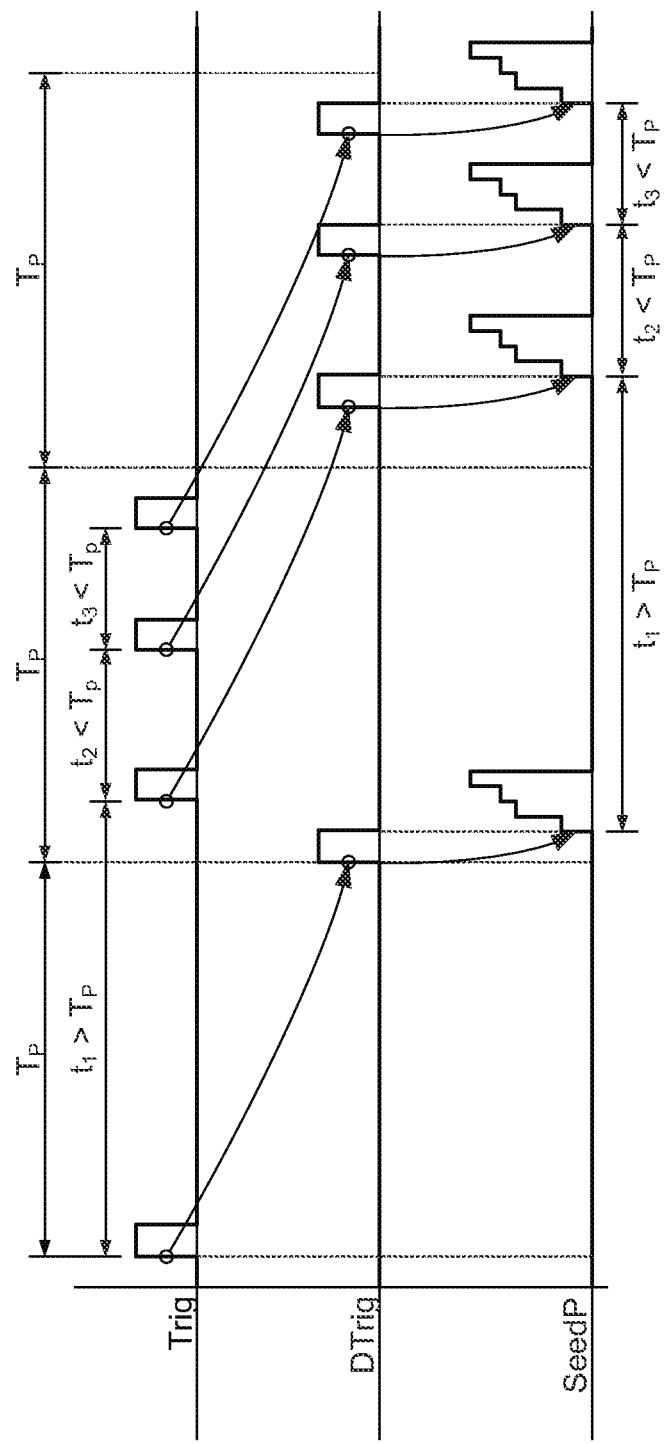
FIG. 16 is a timing diagram showing how the seed pulse generation is triggered by a delayed copy DTrig of a Trig event.

Referring back to FIG. 10, if both DTrig and E_out are input to the Seed Pulse Generator 44, then, as depicted in FIG. 16, every Trig event generates $T_P$ seconds later a single seed pulse SeedP at the desired E_out energy level. The Seed Pulse Generator 44 may have any configuration adapted to generate the seed pulses according to the particular requirements therefor. In some embodiments, the Seed Pulse Generator 44 stores a plurality of gain saturation pre-compensated seed waveforms, each associated with a corresponding value of the desired output energy. Hence, as illustrated at the bottom of FIG. 4, the Seed Pulse Generator may use the E_out input as the starting address of one of these stored waveforms, typically a predetermined sequence of temporal bins that is read out of a memory buffer inside the Generator and output bin-by-bin to the Seed Driver (FIG. 9a) as the seed pulse shape with the desired energy. Suitable configurations for the Seed Pulse Generator 44 are for example disclosed comprehensively in U.S. Pat. No. 8,073,027 to Deladurantaye et al., "DIGITAL LASER PULSE SHAPING MODULE AND SYSTEM" and also in U.S. Patent Application 2012/0177071, Jacob et al., "PULSE SHAPING MODULE AND GENERATOR FOR USE WITH A PULSED LASER OSCILLATOR". The contents of both these documents are incorporated herein by reference in their entirety.

FIG. 10 also shows that both the Trig signal and its delayed copy DTrig are inputted to each of the instances of the Pump Pulse Generator 42. Since identical instances of the Pump Pulse Generator 42 are operating for each of the amplification stages, a Trig event triggers simultaneous pumping of all stages. The pump pulse amplitude and duration are set according to the ($T_T$, PumpA, PumpD) data sets that are output by the Pump Pulse Parameter Selector at each Trig event. This is illustrated in FIG. 17a and FIG. 17b.

Figure 17A:
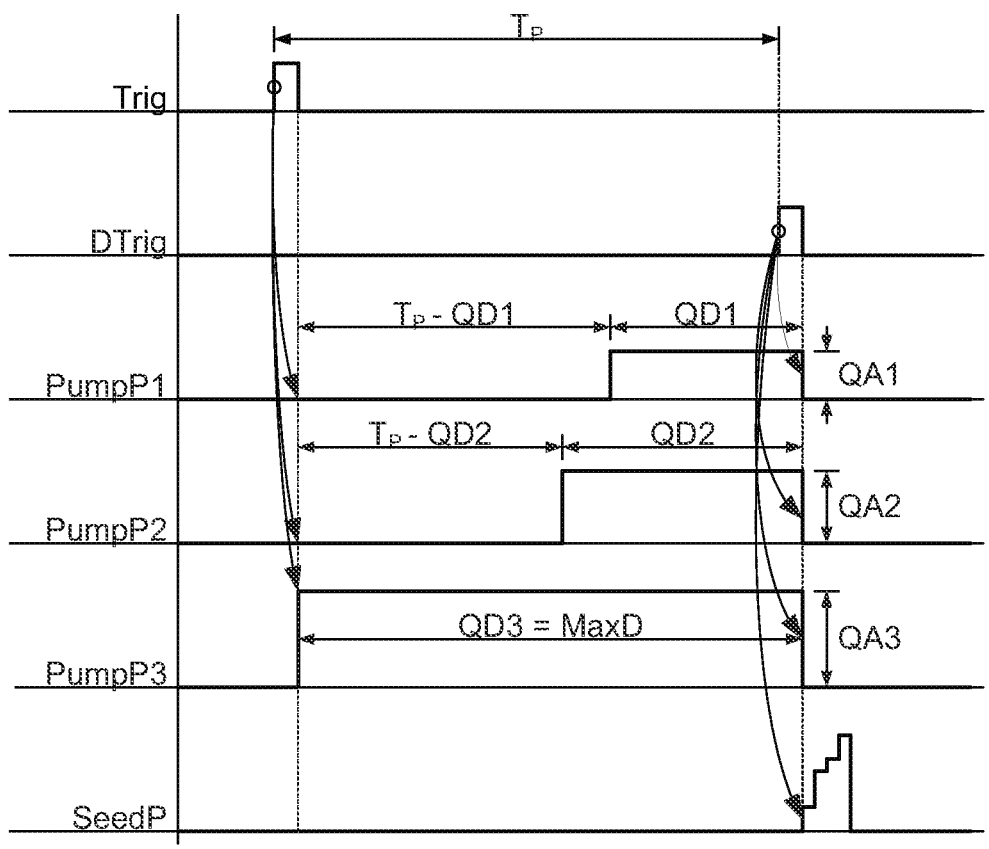
FIG. 17a is a timing diagram showing how pumping is performed concurrently for all the amplification stages following a single-shot Trig event and preceding the generation of a seed pulse.
Figure 17B:
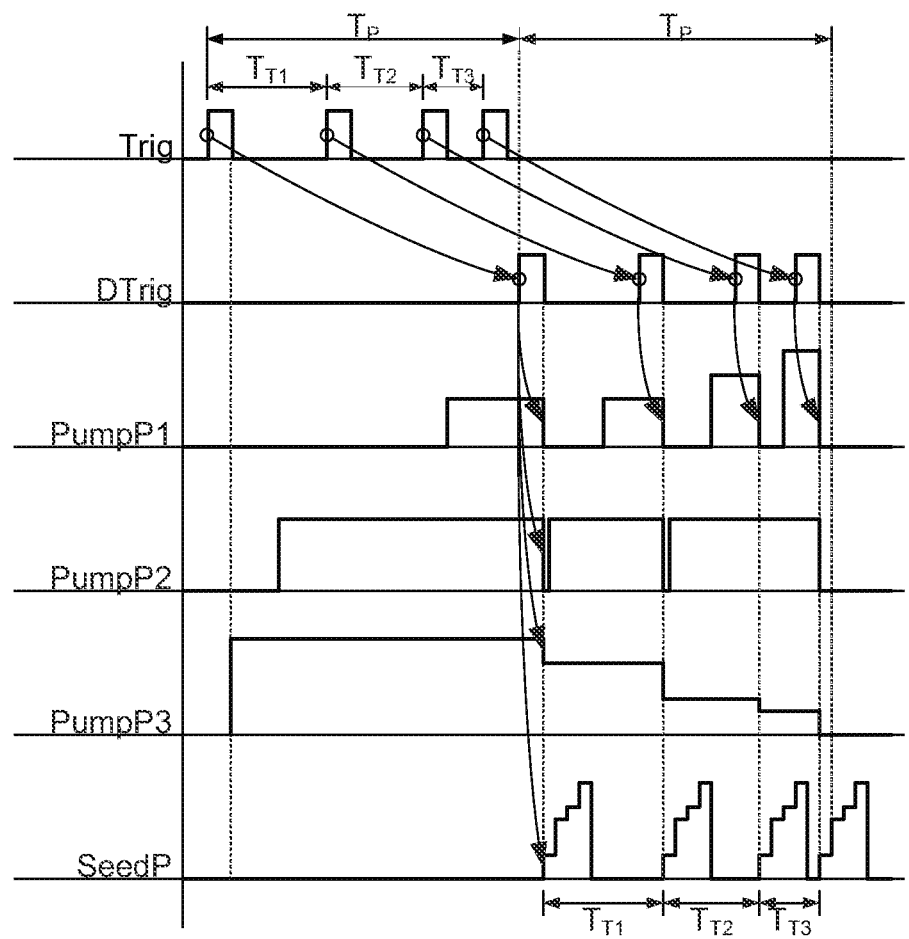
FIG. 17*b* is a timing diagram showing how pumping is performed concurrently for all the amplification stages following a burst of Trig events that occur in time intervals shorter than $T_P$ s.

FIG. 17a illustrates how a Trig event triggers simultaneous pumping of all the amplification stages prior to the emission of a seed pulse, Here, the Trig period is much longer than $T_p$ that it looks as if the laser system is operating in single-shot mode. On the other hand, as was said earlier, the Trig frequency may have any value up to 1 MHz. Consequently, the measured $T_T$ period can decrease down to 1 µs, much shorter than $T_P$=100 µs. In such case, many trig events will happen in an interval of $T_P$ s and consequently, pumping might be either pulsed or continuous, depending on whether PumpD<$T_T$ or PumpD≥$T_T$. These cases are illustrated in FIG. 17b.

In order to describe further how pumping is accomplished according to either FIG. 17a or FIG. 17b, a Pump Pulse Generator according to an embodiment will be described in more details.

Figure 18A:
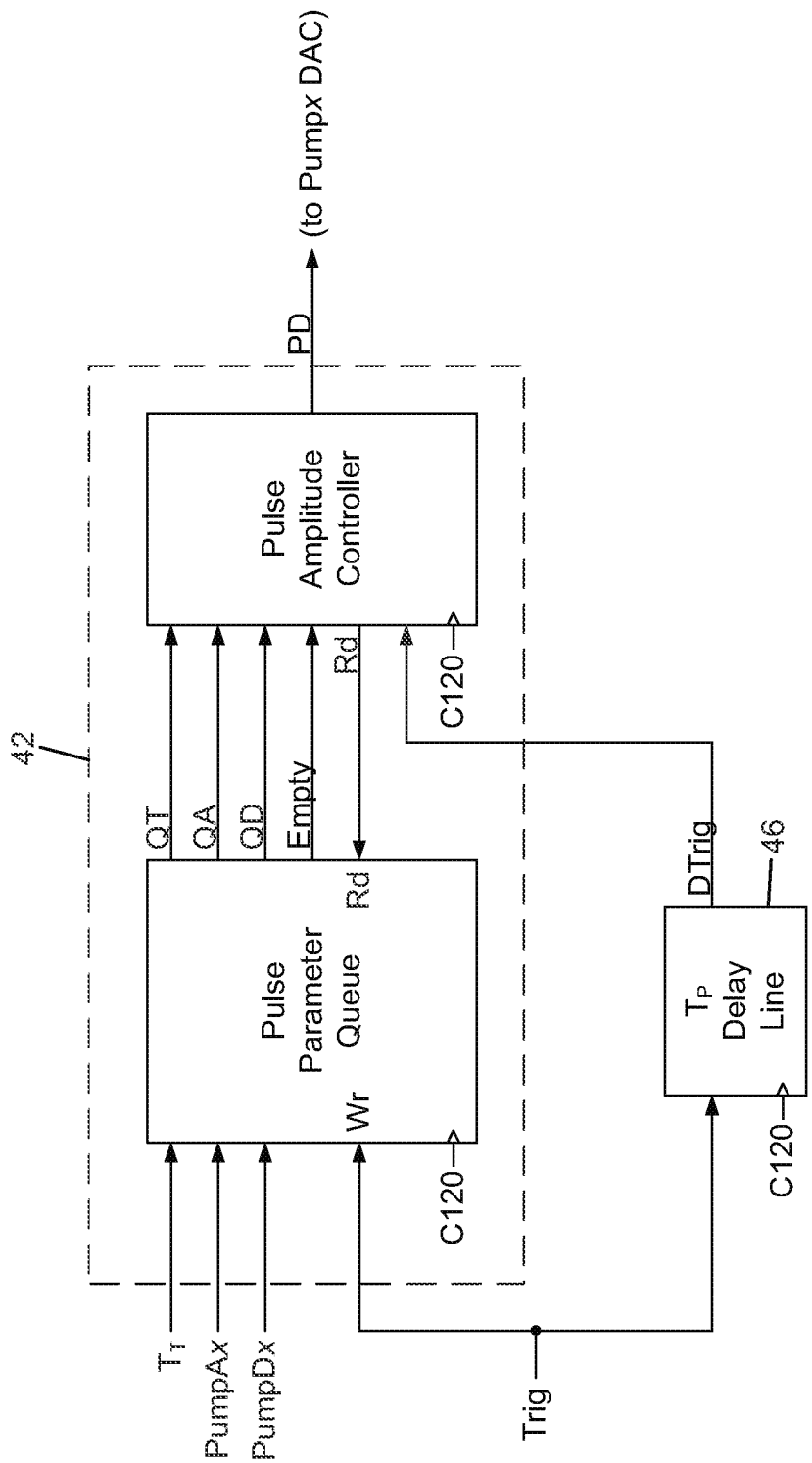
FIG. 18*a* is a block diagram of the Pump Pulse Generator implemented in the Pump and Seed Pulse Generator.

As mentioned above, the controller includes a plurality of pump pulse generators each associated with a corresponding one of the amplification stages. Each pump pulse generator is configured to send a pump pulse to the corresponding amplification stage according to the corresponding selected pump pulse parameters. In some implementations, the Pump Pulse Generators are capable of resolving any pump pulse case where the Trig period is either $T_T$>$T_P$ or $T_T$≤$T_P$. Moreover, in the latter case of $T_T$≤$T_P$, both alternatives PumpD<$T_T$ or PumpD≥$T_T$ are preferably resolved in order to determine the shape of the pump pulse. FIG. 18a illustrates the internal structure of a Pump Pulse Generator 42. To facilitate the understanding of how the Pump Pulse Generator 42 processes the sequence of ($T_T$, PumpA, PumpD) data sets, the $T_P$ Delay Line 46 has been included in FIG. 18a and placed outside of the dashed perimeter that delimits the components internal to the Pump Pulse Generator 42.

In the embodiment of FIG. 18a, the Pump Pulse Generator 42 includes a Pulse Parameter Queue and a Pulse Amplitude Controller.

The Pulse Parameter Queue may be embodied by a first-in, first out (FIFO) memory buffer in which are written the ($T_T$, PumpA, PumpD) data sets output at each Trig event by the Pump Pulse Parameter Selector. It is to be noted that Trig acts in FIG. 18a as a single-cycle write-strobe signal at the Wr command input of the Queue. The Queue also has an Empty output. This output is initially 1 at startup. It will remain in that state until a Trig event occurs, thereby writing at the same time one ($T_T$, PumpA, PumpD) data set in the Queue. Since Empty was 1 before the Trig event, this data set is output immediately at the corresponding (QT, QA, QD) outputs of the Queue and the Empty output simultaneously toggles to 0. The depth of the Queue is sized so that it is possible to write sequentially at least as many ($T_T$, PumpA, PumpD) data sets as the maximum number of Trig events that can occur in a $T_P$ s interval. In the current example implementation of the Controller, $T_P$=100 µs and the minimum value of $T_T$ is 1 µs. Therefore, the Pulse Parameter Queue is preferably capable of accumulating a sequence of at least 100 ($T_T$, PumpA, PumpD) data sets. Since the Queue is first-in, first-out, the data sets are read out in the same order as they were written in. Consequently, the Queue also has a Rd command input, whose purpose is to update the state of the QT, QA, QD and the Empty outputs of the Queue. Normally, Rd is cleared to 0 following system startup and it is kept in this state until Empty transitions from 1 to 0. Once Empty=0, setting Rd=1 for a single clock cycle either sets Empty=1 or keeps Empty=0. In the first case, where Empty=1 after the Rd=1 command, the (QT, QA and QD) data set at the output is invalid data. Otherwise, if Empty is still 0 after the Rd=1, then the (QT, QA and QD) data set is valid, updated data that will be used at the next DTrig event by the Pump Pulse Generator. This will be explained shortly.

The Pump Pulse Generator 42 also includes, as shown in FIG. 18a, a Pulse Amplitude Controller with an output PD through which a sequence of amplitude data words is written into a downstream DAC. The pulse amplitude controller operates according to the sequential flowchart shown in FIG. 18b.

The flowchart shows that the PD output is cleared initially at 0 at startup and that it remains in that state while the controller monitors the Empty output of the Pulse Parameter Queue. As long as Empty=1, the PD output is kept cleared to 0. Upon detection of Empty=0, the controller registers the valid (QT, QA, QD) data set available at the output of the Queue and simultaneously generates a single-cycle Rd=1 at the input of the Queue. Depending of QD and QT, the pulse amplitude controller either sets immediately PD=QA, or it keeps PD=0 for a delay equal to one of (MaxD−QD) or (QT−QD). This is depicted in FIG. 17a. After this delay, the pulse amplitude controller sets PD=QA and then continuously monitors the DTRIG output of the $T_P$ Delay Line. A DTRIG event is necessarily due to happen since a preceding Trig event has caused Empty to clear to 0 and the same event will have traveled through the delay line for $T_P$ sec. Stated otherwise, for any valid data entry read out of the Queue, the pulse amplitude controller can expect that a DTrig event will necessarily happen later. This is shown in the bottom part of the flowchart of FIG. 18b. Upon detection of the DTrig event, the pulse amplitude controller checks if the Queue is Empty. If Empty=1, then no more pumping is required. Therefore the pulse amplitude controller clears to the initial startup state PD=0 and resumes monitoring of the Empty status until it toggles again to 0. On the other hand, if Empty=0, then at least one Trig event happened while pumping was performed. Since we are now exactly $T_P$ s after this event occurred, a new pumping cycle has to be started. Thus, the pulse amplitude controller registers the valid (QT, QA, QD) data set and simultaneously generates a single-cycle Rd=1 at the input of the Queue. The pulse amplitude controller then evaluates immediately these new QT and QD to decide if PD must be set to the new amplitude QA right away or after some delay.

The Pulse Amplitude Controller therefore works in cooperation with the TP Delay Line and the Pulse Parameter Queue so that, depending on whether Empty=0 or Empty=1, the pulse amplitude controller starts pumping or not and also, that any subsequent DTrig event signals the instant for deciding whether the pumping is to be either shut down or kept ongoing, possibly according to a different set of pumping parameters (QT, QA, QD).

It the case of single-shot pumping, as is shown in FIG. 17a, $T_T$>$T_P$ and consequently, QT=$T_T$>$T_P$ is the value at the output of the data Queue of each of the three stages. According to the flowchart in FIG. 18b, therefore, the Pulse Amplitude Controller in each stage sets PD=0 for ($T_P$ QD) sec, with the QD's possibly different from one stage to the other. When the delay is finished, then PD=QA, with the QA's possibly different also from one stage to the other. FIG. 17a depicts a case where QD1<QD2<QD3=MaxD and QA1<QA2<QA3. Since no Trig event has occurred during the $T_P$ s of the pumping interval, the data Queue of each stage is empty when the DTrig event is detected and consequently, PD is set to 0 for each stage so that pumping will remain shut down everywhere until the next Trig event occurs.

FIG. 17b depicts a case of a burst of four Trig events occurring within $T_P$ s and spaced from each other by diminishing intervals such that, $T_P$>$T_{T1}$>$T_{T2}$>$T_{T3}$. The first pumping pulse happens for all the three stages as a single-shot event like the one depicted in FIG. 17a. However, three valid (QT, QA, QD) data sets have accumulated in the data Queue of each stage by the time the first DTrig event occurs.

FIG. 17b shows that for the first stage, the data read successively from the Queue is such that the Pulse Amplitude Controller outputs three pumping pulses with increasing QA's and according to the condition QD<QT≤$T_P$. For the second stage, the QA's are constant, and the timings still obey the condition QD<QT≤$T_P$ except for the last pulse where QD≥QT, QT≤$T_P$. In this case, there is no return to zero for PD as it keeps its value PD=QA until the last Dtrig. This is equivalent to switching dynamically from pulsed pumping to continuous pumping. Finally, FIG. 17b shows that the data in the Queue of the third stage is such that the pulse amplitude controller obeys to the condition OD≥QT, QT≤$T_P$ during all four intervals. Hence, the third stage operates repeatedly in continuous pumping, but with decreasing QA's.

Figure 18B:
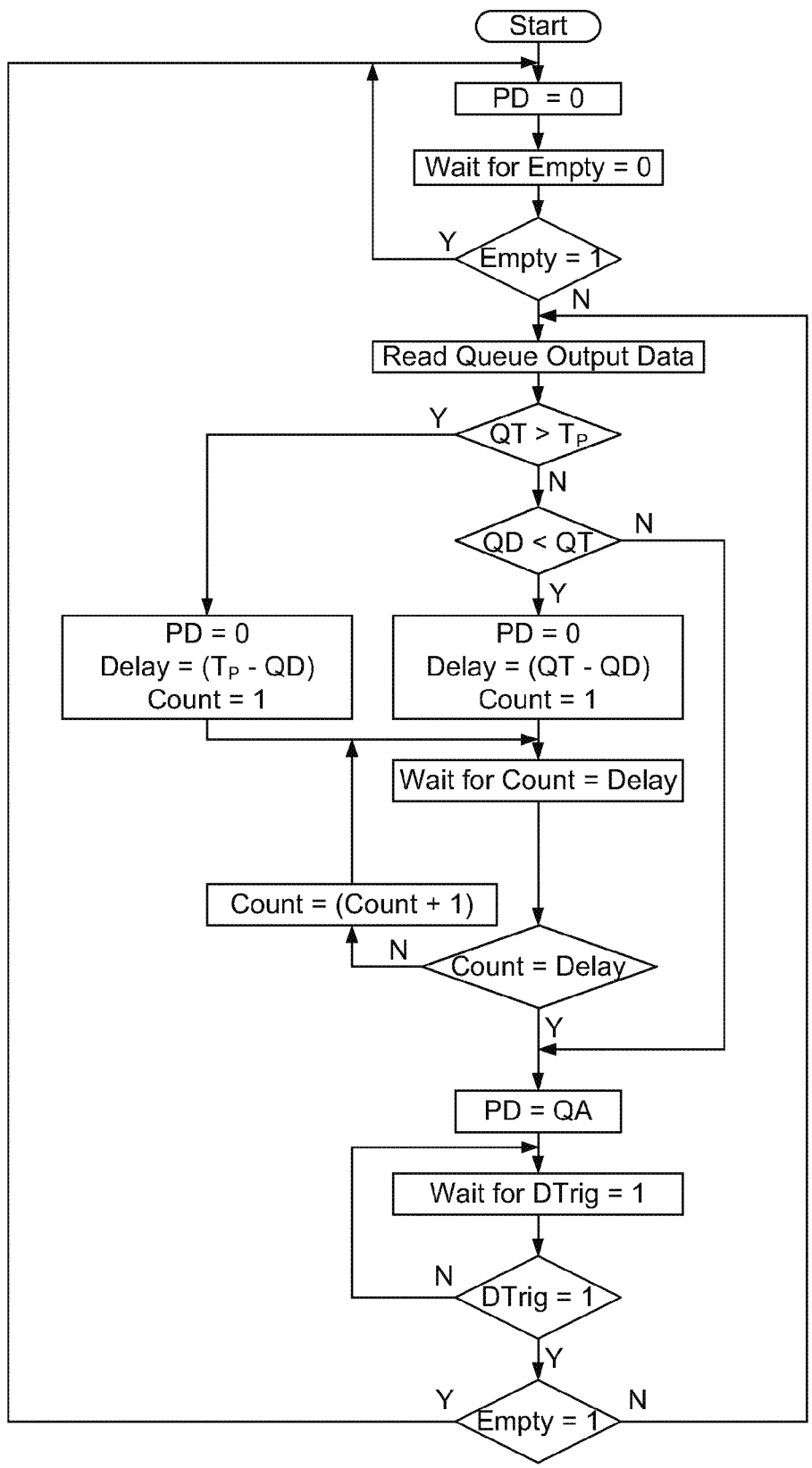
FIG. 18*b* is a sequential flowchart illustrating the operation of the Pulse Amplitude Controller implemented in the Pump Pulse Generator.

It can be deduced from FIG. 17a and FIG. 17b and from the flowchart of FIG. 18b that the Pump Pulse Generator 42 according to the illustrated embodiment is capable of operating at variable amplitude pumping levels and also in single-shot mode or periodic mode with constant or variable frequency. The variable frequency can be increasing or decreasing, and up to a maximum frequency that could, in practice, be well over the example 1 MHz used in the present description. The illustrated Pump Pulse Generator is also capable of switching dynamically from pulsed pumping to continuous pumping and vice-versa.

Laser systems and controllers according to embodiments of the invention may have several practical implementations. Those skilled in the art of fiber laser systems are aware that the signal generation functions for laser pumps described above are only a part of the total electronic functions to be implemented in order to achieve a fully operational fiber laser system. For example, a fiber laser system generally requires that the seed pulse generation be appropriately synchronized with the pump pulse generation. On the other hand, a fiber laser system should comply with laser safety rules and also, it is inherently a delicate instrument even if it is capable of ablating material surfaces. Therefore, a fiber laser system usually also includes thermoelectric cooler (TEC) controls as well as internal monitoring functions of temperature, current, optical intensity, etc, which functions are accompanied by control algorithms capable of forcing quick emergency shutdown of the laser. Finally, it is generally advantageous that a fiber laser system be equipped with a communication port like the I/O port that was discussed above in reference to FIG. 9a. Consequently, electronic laser pump pulse generation can be considered a sub-system that is integrated altogether with other electronic and optical sub-systems of equal necessity in order to constitute a fiber laser system.

In order to support, implement and integrate all the electronic functions outlined in the paragraph above, those familiar with digital electronic design are aware that a solution typically requires memory, phase-lock loops, combinational logic, sequential state-machines, embedded software, a microcontroller and finally digital signal processing slices. This is applicable, for example for the Sync and Clock components in FIG. 9a, the Tp delay line in FIG. 10, the Pump Pulse matrices in FIG. 11a, the Trig Period Counter in FIG. 11b, and finally, the Damper in FIG. 12e. Typically therefore, and referring again to FIG. 9a, most of the components at the left of, and including the Pump and Seed Pulse Generator, may be implemented altogether with the housekeeping and monitoring functions, preferably in a low-cost FPGA like the Spartan-6 XC6SLX100 from Xilinx Inc, San Jose, Calif., It is possible to install a microcontroller into this FPGA, like the Xilinx MicroBlaze, which is appropriate to implement and support the embedded software functions. While this microcontroller is typically programmed using the industry-standard C language, either Verilog or VHDL can be used to program the low-level, real-time functions and programmable logic components in the FPGA as well. The pump DAC's in FIG. 9a can be low-cost DAC's like the DAC8801 from Texas Instruments, Dallas, Tex., On the other hand, the seed DAC is preferably a high-speed DAC, like the AD9736 from Analog Devices, Norwood, Mass.

Of course, numerous modifications could be made to the embodiments described above without departing from the scope of the present invention as defined in the appended claims.

The invention claimed is:

1. A method for emitting optical pulses in view of a desired output energy thereof and an external trigger signal defining trigger pulses at a variable trigger period, the method using a laser system having a seed laser oscillator optically coupled to one or more cascaded optical amplification stages, the method comprising:
   g) providing, for each of the amplification stages, a plurality of sets of pump pulse parameters each associated with specific values of the output energy and the trigger period;
   h) receiving said desired value of the output energy and said trigger signal;
   for each of the trigger pulses in the received trigger signal;
   i) measuring a current value of the trigger period;
   j) selecting, for each of the amplification stages, the pumping parameters associated with the received desired value of the output energy and the current value of the trigger period;
   k) sending a pump pulse to each of the amplification stages according to the corresponding selected pump pulse parameters; and
   l) launching a seed pulse from the seed laser oscillator for propagation through the amplification stages after the pumping thereof.

2. The method according to claim 1, wherein each set of pump pulse parameters comprises a pump pulse amplitude value and a pump pulse duration value.

3. The method according to claim 1, wherein the pump pulses of step k) are synchronized to end simultaneously.

4. The method according to claim 1, comprising delaying the launching of step l) for a predetermined delay after the corresponding trigger pulse is received.

5. The method according to claim 1, further comprising determining an input waveform of the seed pulse based on a desired output waveform of the optical pulses and on the desired output energy.

6. A laser system for emitting optical pulses in view of a desired value of an output energy thereof and an external trigger signal defining trigger pulses at a variable trigger period, comprising:
   a seed laser oscillator;
   one or more cascaded amplification stages optically coupled to the seed laser oscillator; and
   a controller, comprising:
   energy and trig inputs for receiving said desired value of the output energy and said trigger signal, respectively;
   a trigger period counter configured to measure a current value of the trigger period associated with each trigger pulse;
   a pump pulse parameter selector comprising, for each of the amplification stages, a plurality of sets of pump pulse parameters, each set associated with specific values of the output energy and the trigger period, the pump pulse parameter selector being configured to select at each trigger pulse of the trigger signal and for each of the amplification stages, the one of the sets of pump pulse parameters associated with the received desired value of the output energy and the current value of the trigger period;

a plurality of pump pulse generators each associated with a corresponding one of the amplification stages, each pump pulse generator being configured to send a pump pulse to the corresponding amplification stage according to the corresponding selected pump pulse parameters; and a seed pulse generator for launching a seed optical pulse from the seed laser oscillator for propagation through the amplification stages after the pumping thereof.

7. The laser system according to claim 6, wherein the controller further comprises a delay line configured to provide a time delay to the pump pulse generators and to the seed pulse generator, the pump pulse generators sending the corresponding pump pulses during said time delay and the seed pulse generator launching the seed optical pulse alter said time delay.

8. The laser system according to claim 6, wherein the seed pulse generator stores a plurality of gain saturation pre-compensated seed waveforms, each associated with a corresponding value of the desired output energy.

9. A controller for controlling a laser system to emitting optical pulses in view of a desired value of an output energy thereof and an external trigger signal defining trigger pulses at a trigger period, the laser system having a seed laser oscillator and one or more cascaded amplification stages optically coupled to the seed laser oscillator, the controller comprising:

energy and trig inputs for receiving said desired value of the output energy and said trigger signal, respectively;

a trigger period counter configured to measure a current value of the trigger period associated with each trigger pulse;

a pump pulse parameter selector comprising, for each of the amplification stages, a plurality of sets of pump pulse parameters, each set associated with specific values of the output energy and the trigger period, the pump pulse parameter selector being configured to select at each trigger pulse of the trigger signal and for each of the amplification stages, the one of the sets of pump pulse parameters associated with the received desired value of the output energy and the current value of the trigger period;

a plurality of pump pulse generators each associated with a corresponding one of the amplification stages, each pump pulse generator being configured to send a pump pulse to the corresponding amplification stage according to the corresponding selected pump pulse parameters; and a seed pulse generator for launching a seed optical pulse from the seed laser oscillator for propagation through the amplification stages after the pumping thereof.

* * * * *